(12) United States Patent
Faulkinbury

(10) Patent No.: US 11,396,470 B2
(45) Date of Patent: Jul. 26, 2022

(54) CONTINUOUS FLOW SUBMERGED COMBUSTION MELTER COOLING WALL PANELS, SUBMERGED COMBUSTION MELTERS, AND METHODS OF USING SAME

(71) Applicant: JOHNS MANVILLE, Denver, CO (US)

(72) Inventor: Albert Patrick Faulkinbury, Highlands Ranch, CO (US)

(73) Assignee: Johns Manville, Denver, CO (US)

( * ) Notice: Subject to any disclaimer, the term of this patent is extended or adjusted under 35 U.S.C. 154(b) by 458 days.

(21) Appl. No.: 16/374,110

(22) Filed: Apr. 3, 2019

(65) Prior Publication Data

US 2019/0241454 A1 Aug. 8, 2019

Related U.S. Application Data

(62) Division of application No. 15/247,515, filed on Aug. 25, 2016, now Pat. No. 10,301,208.

(51) Int. Cl.
*F27D 1/12* (2006.01)
*C03B 5/44* (2006.01)
(Continued)

(52) U.S. Cl.
CPC .............. *C03B 5/2356* (2013.01); *C03B 5/44* (2013.01); *C03B 3/02* (2013.01)

(58) Field of Classification Search
CPC ........................................................ C03B 5/44
See application file for complete search history.

(56) References Cited

U.S. PATENT DOCUMENTS

| 452,607 | A | 5/1891 | Hunt |
| 1,579,353 | A | 4/1926 | Good |

(Continued)

FOREIGN PATENT DOCUMENTS

| CH | 254 502 A | 5/1948 |
| DE | 10 38 721 B | 9/1958 |

(Continued)

OTHER PUBLICATIONS

"Gamma Irradiators for Radiation Processing" Booklet, International Atomic Energy Agency, Vienna, Austria.

(Continued)

*Primary Examiner* — Jodi C Franklin
(74) *Attorney, Agent, or Firm* — Robert D. Touslee

(57) ABSTRACT

Continuous flow submerged combustion melter cooling wall panels, including a primary metal plate, and several 90 degree metal pieces welded to the primary metal plate in parallel configuration, each of the 90 degree metal pieces having metal leg plates forming a 90 degree vertex there between. Each metal leg plate has an edge distal to the vertex, the distal edge of the first metal leg plate welded to the first major surface of the primary metal plate, the distal edge of the second metal leg plate welded to the vertex of an adjacent 90 degree metal piece. The plurality of 90 degree metal pieces may have a length (l) such that l<L, each welded to the primary metal plate in staggered configuration to form, along with first and second end plates and a seal plate, a serpentine continuous flow coolant channel.

13 Claims, 9 Drawing Sheets

(51) Int. Cl.
  *C03B 5/235* (2006.01)
  *C03B 3/02* (2006.01)

(56) References Cited

U.S. PATENT DOCUMENTS

| | | | |
|---|---|---|---|
| 1,636,151 A | 7/1927 | Schofield | |
| 1,679,295 A | 7/1928 | Dodge | |
| 1,706,857 A | 3/1929 | Mathe | |
| 1,707,242 A * | 4/1929 | Wildermuth | C03B 5/44 122/6.5 |
| 1,716,433 A | 6/1929 | Ellis | |
| 1,875,474 A | 9/1932 | McKinley | |
| 1,883,023 A | 10/1932 | Slick | |
| 1,937,321 A | 11/1933 | Howard | |
| 1,944,855 A | 1/1934 | Wadman | |
| 1,989,103 A | 1/1935 | McKelvey et al. | |
| 2,007,309 A * | 7/1935 | Sengstaken | F22D 1/06 165/162 |
| 2,042,560 A | 6/1936 | Stewart | |
| 2,064,546 A | 12/1936 | Kutchka | |
| 2,174,533 A | 10/1939 | See et al. | |
| 2,118,479 A | 1/1940 | McCaskey | |
| 2,269,459 A | 1/1942 | Kleist | |
| 2,432,942 A | 12/1947 | See et al. | |
| 2,455,907 A | 1/1948 | Slayter | |
| 2,597,858 A | 5/1952 | Howard | |
| 2,658,094 A | 11/1953 | Nonken | |
| 2,677,003 A | 4/1954 | Arbett et al. | |
| 2,679,749 A | 6/1954 | Poole | |
| 2,691,689 A | 10/1954 | Arbeit et al. | |
| 2,718,096 A | 9/1955 | Henry et al. | |
| 2,773,545 A | 12/1956 | Petersen | |
| 2,781,756 A | 2/1957 | Kobe | |
| 2,867,972 A | 1/1959 | Holderreed et al. | |
| 2,878,644 A | 3/1959 | Fenn | |
| 2,890,166 A | 6/1959 | Heinze | |
| 2,902,029 A | 9/1959 | Hill | |
| 2,981,250 A | 4/1961 | Stewart | |
| 3,020,165 A | 2/1962 | Davis | |
| 3,056,283 A | 10/1962 | Tiede | |
| 3,070,970 A | 1/1963 | Zagar et al. | |
| 3,073,683 A | 1/1963 | Switzer et al. | |
| 3,084,392 A | 4/1963 | Labino | |
| 3,088,812 A | 5/1963 | Bitterlich et al. | |
| 3,104,947 A | 9/1963 | Switzer et al. | |
| 3,129,087 A | 4/1964 | Hagy | |
| 3,160,578 A | 12/1964 | Saxton et al. | |
| 3,165,452 A | 1/1965 | Williams | |
| 3,170,781 A | 2/1965 | Keefer | |
| 3,174,820 A | 3/1965 | See et al. | |
| 3,215,189 A | 11/1965 | Bauer | |
| 3,224,855 A | 12/1965 | Plumat | |
| 3,226,220 A | 12/1965 | Plumat | |
| 3,237,929 A | 3/1966 | Plumat et al. | |
| 3,239,325 A | 3/1966 | Roberson et al. | |
| 3,241,548 A | 3/1966 | See et al. | |
| 3,245,769 A | 4/1966 | Eck et al. | |
| 3,248,205 A | 4/1966 | Dolf et al. | |
| 3,248,206 A | 4/1966 | Apple et al. | |
| 3,260,587 A | 7/1966 | Dolf et al. | |
| 3,268,313 A | 8/1966 | Burgman et al. | |
| 3,285,834 A | 11/1966 | Guerrieri et al. | |
| 3,294,512 A | 12/1966 | Penberthy | |
| 3,325,298 A | 6/1967 | Brown | |
| 3,375,095 A | 3/1968 | Poole | |
| 3,380,463 A | 4/1968 | Trethewey | |
| 3,385,686 A | 5/1968 | Plumat et al. | |
| 3,402,025 A | 9/1968 | Garrett et al. | |
| 3,407,805 A | 10/1968 | Bougard | |
| 3,407,862 A | 10/1968 | Mustian, Jr. | |
| 3,420,510 A | 1/1969 | Griem | |
| 3,421,873 A | 1/1969 | Burgman et al. | |
| 3,421,876 A | 1/1969 | Schmidt | |
| 3,432,399 A | 3/1969 | Schutt | |
| 3,442,633 A | 5/1969 | Perry | |
| 3,445,214 A | 5/1969 | Oremesher | |
| 3,459,602 A * | 8/1969 | Mueller | C21D 1/70 148/22 |
| 3,498,779 A | 3/1970 | Hathaway | |
| 3,499,743 A | 3/1970 | Fanica et al. | |
| 3,510,393 A | 5/1970 | Burgman et al. | |
| 3,519,412 A | 7/1970 | Olink | |
| 3,525,674 A | 8/1970 | Bamebey | |
| 3,533,770 A | 10/1970 | Adler et al. | |
| 3,547,611 A | 12/1970 | Williams | |
| 3,563,683 A | 2/1971 | Hess | |
| 3,573,016 A | 3/1971 | Rees | |
| 3,592,151 A | 7/1971 | Webber | |
| 3,592,623 A | 7/1971 | Shepherd | |
| 3,600,149 A | 8/1971 | Chen et al. | |
| 3,606,825 A | 9/1971 | Johnson | |
| 3,617,234 A | 11/1971 | Hawkins et al. | |
| 3,627,504 A | 12/1971 | Johnson et al. | |
| 3,632,335 A | 1/1972 | Worner | |
| 3,649,235 A | 3/1972 | Harris | |
| 3,692,017 A | 9/1972 | Glachant et al. | |
| 3,717,139 A | 2/1973 | Guillet et al. | |
| 3,738,792 A | 6/1973 | Feng | |
| 3,741,656 A | 6/1973 | Shapiro | |
| 3,741,742 A | 6/1973 | Jennings | |
| 3,746,527 A | 7/1973 | Knavish et al. | |
| 3,747,588 A | 7/1973 | Malmin | |
| 3,754,879 A | 8/1973 | Phaneuf | |
| 3,756,800 A | 9/1973 | Phaneuf | |
| 3,763,915 A | 10/1973 | Perry et al. | |
| 3,764,287 A | 10/1973 | Brocious | |
| 3,771,988 A | 11/1973 | Starr | |
| 3,788,832 A | 1/1974 | Nesbitt | |
| 3,818,893 A | 6/1974 | Kataoka et al. | |
| 3,835,909 A | 9/1974 | Douglas et al. | |
| 3,840,002 A | 10/1974 | Douglas et al. | |
| 3,843,106 A | 10/1974 | Nanjyo et al. | |
| 3,856,496 A | 12/1974 | Nesbitt et al. | |
| 3,885,945 A | 5/1975 | Rees et al. | |
| 3,907,585 A | 9/1975 | Francel et al. | |
| 3,913,560 A | 10/1975 | Lazarre et al. | |
| 3,929,445 A | 12/1975 | Zippe | |
| 3,936,290 A | 2/1976 | Cerutti et al. | |
| 3,951,635 A | 4/1976 | Rough | |
| 3,976,464 A | 8/1976 | Wardlaw | |
| 4,001,001 A | 1/1977 | Knavish et al. | |
| 4,004,903 A | 1/1977 | Daman et al. | |
| 4,028,083 A | 6/1977 | Patznick et al. | |
| 4,083,711 A | 4/1978 | Jensen | |
| 4,101,304 A | 7/1978 | Marchand | |
| 4,110,098 A | 8/1978 | Mattmuller | |
| 4,121,809 A * | 10/1978 | Dhelft | C21B 7/10 266/193 |
| 4,153,438 A | 5/1979 | Stream | |
| 4,185,982 A | 1/1980 | Schwenninger | |
| 4,203,761 A | 5/1980 | Rose | |
| 4,205,966 A | 6/1980 | Horikawa | |
| 4,208,201 A | 6/1980 | Rueck | |
| 4,221,922 A * | 9/1980 | Okimune | F27D 1/12 110/336 |
| 4,226,564 A | 10/1980 | Takahashi et al. | |
| 4,238,226 A | 12/1980 | Sanzenbacher et al. | |
| 4,249,927 A | 2/1981 | Fakuzaki et al. | |
| 4,270,740 A | 6/1981 | Sanzenbacher et al. | |
| 4,282,023 A | 8/1981 | Hammel et al. | |
| 4,303,435 A | 12/1981 | Sleighter | |
| 4,309,204 A | 1/1982 | Brooks | |
| 4,316,734 A | 2/1982 | Spinosa et al. | |
| 4,323,718 A | 4/1982 | Buhring et al. | |
| 4,345,332 A * | 8/1982 | Wronka | F27B 3/12 373/74 |
| 4,349,376 A | 9/1982 | Dunn et al. | |
| 4,351,055 A * | 9/1982 | Bick | F27B 3/24 373/76 |
| 4,360,373 A | 11/1982 | Pecoraro | |
| 4,397,692 A | 8/1983 | Ramge et al. | |
| 4,398,925 A | 8/1983 | Trinh et al. | |
| 4,405,351 A | 9/1983 | Sheinkop | |
| 4,406,683 A | 9/1983 | Demarest | |

(56) References Cited

U.S. PATENT DOCUMENTS

| | | | |
|---|---|---|---|
| 4,413,882 A | 11/1983 | Bailey et al. | |
| 4,424,071 A | 1/1984 | Steitz et al. | |
| 4,432,780 A | 2/1984 | Propster et al. | |
| 4,434,495 A * | 2/1984 | Tomizawa | F27D 1/12 |
| | | | 373/76 |
| 4,453,500 A | 6/1984 | Kuhlmann et al. | |
| 4,455,017 A * | 6/1984 | Wunsche | F27B 3/24 |
| | | | 266/190 |
| 4,455,762 A | 6/1984 | Saeman | |
| 4,461,576 A | 7/1984 | King | |
| 4,488,537 A | 12/1984 | Laurent | |
| 4,508,970 A | 4/1985 | Ackerman | |
| 4,534,507 A * | 8/1985 | Matsuda | B60H 1/00328 |
| | | | 165/46 |
| 4,539,034 A | 9/1985 | Hanneken | |
| 4,542,106 A | 9/1985 | Sproul | |
| 4,545,800 A | 10/1985 | Won et al. | |
| 4,549,896 A | 10/1985 | Streicher et al. | |
| 4,557,202 A * | 12/1985 | Warner | F28D 7/08 |
| | | | 110/216 |
| 4,561,639 A * | 12/1985 | Kudinov | C21B 7/10 |
| | | | 266/193 |
| 4,599,100 A | 7/1986 | Demarest | |
| 4,622,007 A | 11/1986 | Gitman | |
| 4,626,199 A | 12/1986 | Bounini | |
| 4,632,687 A | 12/1986 | Kunkle et al. | |
| 4,634,461 A | 1/1987 | Demarest, Jr. et al. | |
| 4,637,034 A * | 1/1987 | Grageda | F27B 3/24 |
| | | | 373/76 |
| 4,657,586 A | 4/1987 | Masterson et al. | |
| 4,718,931 A | 1/1988 | Boettner | |
| 4,723,708 A | 2/1988 | Berger et al. | |
| 4,735,642 A | 4/1988 | Jensen et al. | |
| 4,738,938 A | 4/1988 | Kunkle et al. | |
| 4,758,259 A | 7/1988 | Jensen | |
| 4,780,122 A | 10/1988 | Schwenninger et al. | |
| 4,794,860 A | 1/1989 | Welton | |
| 4,798,616 A | 1/1989 | Knavish et al. | |
| 4,812,372 A | 3/1989 | Kithany | |
| 4,814,387 A | 3/1989 | Donat | |
| 4,816,056 A | 3/1989 | Tsai et al. | |
| 4,818,265 A | 4/1989 | Krumwiede et al. | |
| 4,877,436 A | 10/1989 | Sheinkop | |
| 4,877,449 A | 10/1989 | Khinkis | |
| 4,878,829 A | 11/1989 | Anderson | |
| 4,882,736 A | 11/1989 | Pieper | |
| 4,886,539 A | 12/1989 | Gerutti et al. | |
| 4,900,337 A | 2/1990 | Zortea et al. | |
| 4,903,640 A * | 2/1990 | Howard | F27D 1/12 |
| | | | 122/499 |
| 4,919,700 A | 4/1990 | Pecoraro et al. | |
| 4,927,886 A | 5/1990 | Backderf et al. | |
| 4,932,035 A | 6/1990 | Pieper | |
| 4,953,376 A | 9/1990 | Merlone | |
| 4,963,731 A | 10/1990 | King | |
| 4,969,942 A | 11/1990 | Schwenninger et al. | |
| 4,973,346 A | 11/1990 | Kobayashi et al. | |
| 5,011,086 A | 4/1991 | Sonnleitner | |
| 5,032,230 A | 7/1991 | Shepherd | |
| 5,052,874 A | 10/1991 | Johanson | |
| 5,062,789 A | 11/1991 | Gitman | |
| 5,097,802 A | 3/1992 | Clawson | |
| 5,168,109 A | 12/1992 | Backderf et al. | |
| 5,169,424 A | 12/1992 | Grinnen et al. | |
| 5,194,747 A | 3/1993 | Culpepper et al. | |
| 5,197,080 A * | 3/1993 | Johnson | F27D 1/12 |
| | | | 138/95 |
| 5,199,866 A | 4/1993 | Joshi et al. | |
| 5,204,082 A | 4/1993 | Schendel | |
| 5,299,929 A | 4/1994 | Yap | |
| 5,360,171 A | 11/1994 | Yap | |
| 5,374,595 A | 12/1994 | Dumbaugh et al. | |
| 5,405,082 A | 4/1995 | Brown et al. | |
| 5,412,882 A | 5/1995 | Zippe et al. | |
| 5,426,664 A * | 6/1995 | Grove | F27B 3/24 |
| | | | 110/336 |
| 5,449,286 A | 9/1995 | Snyder et al. | |
| 5,473,885 A | 12/1995 | Hunter, Jr. et al. | |
| 5,483,548 A | 1/1996 | Coble | |
| 5,490,775 A | 2/1996 | Joshi et al. | |
| 5,522,721 A | 6/1996 | Drogue et al. | |
| 5,545,031 A | 8/1996 | Joshi et al. | |
| 5,575,637 A | 11/1996 | Slavejkov et al. | |
| 5,586,999 A | 12/1996 | Kobayashi | |
| 5,595,703 A | 1/1997 | Swaelens et al. | |
| 5,606,965 A | 3/1997 | Panz et al. | |
| 5,613,994 A | 3/1997 | Muniz et al. | |
| 5,615,668 A | 4/1997 | Panz et al. | |
| 5,636,623 A | 6/1997 | Panz et al. | |
| 5,672,827 A | 9/1997 | Jursich | |
| 5,713,668 A | 2/1998 | Lunghofer et al. | |
| 5,718,741 A | 2/1998 | Hull et al. | |
| 5,724,901 A | 3/1998 | Guy et al. | |
| 5,736,476 A | 4/1998 | Warzke et al. | |
| 5,740,196 A * | 4/1998 | Johnson | F16L 43/001 |
| | | | 373/71 |
| 5,743,723 A | 4/1998 | Iatrides et al. | |
| 5,765,964 A | 6/1998 | Calcote et al. | |
| 5,814,121 A | 9/1998 | Travis | |
| 5,829,962 A | 11/1998 | Drasek et al. | |
| 5,833,447 A | 11/1998 | Bodelin et al. | |
| 5,849,058 A | 12/1998 | Takeshita et al. | |
| 5,863,195 A | 1/1999 | Feldermann | |
| 5,887,978 A | 3/1999 | Lunghofer et al. | |
| 5,944,507 A | 8/1999 | Feldermann | |
| 5,944,864 A | 8/1999 | Hull et al. | |
| 5,954,498 A | 9/1999 | Joshi et al. | |
| 5,975,886 A | 11/1999 | Phillippe | |
| 5,979,191 A | 11/1999 | Jian | |
| 5,984,667 A | 11/1999 | Phillippe et al. | |
| 5,993,203 A | 11/1999 | Koppang | |
| 6,029,910 A | 2/2000 | Joshi et al. | |
| 6,036,480 A | 3/2000 | Hughes et al. | |
| 6,039,787 A | 3/2000 | Edlinger | |
| 6,041,854 A * | 3/2000 | Fox | F22B 37/12 |
| | | | 122/6 A |
| 6,044,667 A | 4/2000 | Chenoweth | |
| 6,045,353 A | 4/2000 | VonDrasek et al. | |
| 6,068,468 A | 5/2000 | Phillipe et al. | |
| 6,071,116 A | 6/2000 | Phillipe et al. | |
| 6,074,197 A | 6/2000 | Phillippe | |
| 6,077,072 A | 6/2000 | Marin et al. | |
| 6,085,551 A | 7/2000 | Pieper et al. | |
| 6,109,062 A | 8/2000 | Richards | |
| 6,113,389 A | 9/2000 | Joshi et al. | |
| 6,116,896 A | 9/2000 | Joshi et al. | |
| 6,120,889 A | 9/2000 | Turner et al. | |
| 6,123,542 A | 9/2000 | Joshi et al. | |
| 6,126,438 A | 10/2000 | Joshi et al. | |
| 6,137,823 A * | 10/2000 | Johnson | F27B 3/24 |
| | | | 373/71 |
| 6,154,481 A | 11/2000 | Sorg et al. | |
| 6,156,285 A | 12/2000 | Adams et al. | |
| 6,171,100 B1 | 1/2001 | Joshi et al. | |
| 6,178,777 B1 | 1/2001 | Chenoweth | |
| 6,183,848 B1 | 2/2001 | Turner et al. | |
| 6,210,151 B1 | 4/2001 | Joshi et al. | |
| 6,210,703 B1 | 4/2001 | Novich | |
| 6,221,312 B1 * | 4/2001 | Van Laar | C21C 5/44 |
| | | | 266/193 |
| 6,237,369 B1 | 5/2001 | LeBlanc et al. | |
| 6,241,514 B1 | 6/2001 | Joshi et al. | |
| 6,244,197 B1 * | 6/2001 | Coble | F23M 5/06 |
| | | | 110/180 |
| 6,244,857 B1 | 6/2001 | VonDrasek et al. | |
| 6,247,315 B1 | 6/2001 | Marin et al. | |
| 6,250,136 B1 | 6/2001 | Igreja | |
| 6,250,916 B1 | 6/2001 | Phillipe et al. | |
| 6,274,164 B1 | 8/2001 | Novich | |
| 6,276,924 B1 | 8/2001 | Joshi et al. | |
| 6,276,928 B1 | 8/2001 | Joshi et al. | |
| 6,293,277 B1 | 9/2001 | Panz et al. | |
| 6,314,760 B1 | 11/2001 | Chenoweth | |

(56) References Cited

U.S. PATENT DOCUMENTS

| | | | |
|---|---|---|---|
| 6,314,896 B1 | 11/2001 | Marin et al. | |
| 6,318,126 B1 | 11/2001 | Takei et al. | |
| 6,332,339 B1 | 12/2001 | Kawaguchi et al. | |
| 6,338,337 B1 | 1/2002 | Panz et al. | |
| 6,339,610 B1 | 1/2002 | Hoyer et al. | |
| 6,344,747 B1 | 2/2002 | Lunghofer et al. | |
| 6,357,264 B1 | 3/2002 | Richards | |
| 6,386,271 B1 | 5/2002 | Kawamoto et al. | |
| 6,398,547 B1 | 6/2002 | Joshi et al. | |
| 6,404,799 B1 | 6/2002 | Mori et al. | |
| 6,418,755 B2 | 7/2002 | Chenoweth | |
| 6,422,041 B1 | 7/2002 | Simpson et al. | |
| 6,454,562 B1 | 9/2002 | Joshi et al. | |
| 6,460,376 B1 | 10/2002 | Jeanvoine et al. | |
| 6,470,710 B1 | 10/2002 | Takei et al. | |
| 6,536,238 B2 | 3/2003 | Kawaguchi et al. | |
| 6,536,651 B2 | 3/2003 | Ezumi et al. | |
| 6,558,606 B1 | 5/2003 | Kulkarni et al. | |
| 6,563,855 B1 * | 5/2003 | Nishi | F27D 1/12 373/76 |
| 6,578,779 B2 | 6/2003 | Dion | |
| 6,580,743 B1 * | 6/2003 | Hirata | C21B 7/10 373/75 |
| 6,660,106 B1 | 12/2003 | Babel et al. | |
| 6,694,791 B1 | 2/2004 | Johnson et al. | |
| 6,701,617 B2 | 3/2004 | Li et al. | |
| 6,701,751 B2 | 3/2004 | Arechaga et al. | |
| 6,705,118 B2 | 3/2004 | Simpson et al. | |
| 6,708,527 B1 | 3/2004 | Ibarlucea et al. | |
| 6,711,942 B2 | 3/2004 | Getman et al. | |
| 6,715,319 B2 | 4/2004 | Barrow et al. | |
| 6,722,161 B2 | 4/2004 | LeBlanc | |
| 6,729,389 B2 * | 5/2004 | Ohashi | F28D 1/0383 165/168 |
| 6,736,129 B1 | 5/2004 | Sjith | |
| 6,739,152 B2 | 5/2004 | Jeanvoine et al. | |
| 6,796,147 B2 | 9/2004 | Borysowicz et al. | |
| 6,797,351 B2 | 9/2004 | Kulkarni et al. | |
| 6,854,290 B2 | 2/2005 | Hayes et al. | |
| 6,857,999 B2 | 2/2005 | Jeanvoine | |
| 6,883,349 B1 | 4/2005 | Jeanvoine | |
| 6,918,256 B2 | 7/2005 | Gutmark et al. | |
| 7,011,142 B2 * | 3/2006 | Davies | F28F 3/12 165/80.4 |
| 7,027,467 B2 | 4/2006 | Baev et al. | |
| 7,116,888 B1 | 10/2006 | Aitken et al. | |
| 7,134,300 B2 | 11/2006 | Hayes et al. | |
| 7,168,395 B2 | 1/2007 | Engdahl | |
| 7,175,423 B1 | 2/2007 | Pisano et al. | |
| 7,213,638 B2 * | 5/2007 | Seiler | F28F 3/12 165/148 |
| 7,231,788 B2 | 6/2007 | Karetta et al. | |
| 7,273,583 B2 | 9/2007 | Rue et al. | |
| 7,330,634 B2 | 2/2008 | Aitken et al. | |
| 7,383,698 B2 | 6/2008 | Ichinose et al. | |
| 7,392,668 B2 | 7/2008 | Adams et al. | |
| 7,428,827 B2 | 9/2008 | Maugendre et al. | |
| 7,441,686 B2 | 10/2008 | Odajima et al. | |
| 7,448,231 B2 | 11/2008 | Jeanvoine et al. | |
| 7,454,925 B2 | 11/2008 | DeAngelis et al. | |
| 7,509,819 B2 | 3/2009 | Baker et al. | |
| 7,530,238 B2 * | 5/2009 | Eichholz | C03B 5/027 65/135.6 |
| 7,544,321 B2 * | 6/2009 | Loebner | F27D 9/00 266/241 |
| 7,565,819 B2 | 7/2009 | Jeanvoine et al. | |
| 7,578,988 B2 | 8/2009 | Jacques et al. | |
| 7,581,948 B2 | 9/2009 | Borders et al. | |
| 7,622,677 B2 | 11/2009 | Barberree et al. | |
| 7,624,595 B2 | 12/2009 | Jeanvoine et al. | |
| 7,748,592 B2 | 7/2010 | Koga et al. | |
| 7,767,606 B2 | 8/2010 | McGinnis et al. | |
| 7,778,290 B2 | 8/2010 | Sacks et al. | |
| 7,781,562 B2 | 8/2010 | Crawford et al. | |
| 7,802,452 B2 | 9/2010 | Borders et al. | |
| 7,832,365 B2 | 11/2010 | Hannum et al. | |
| 7,832,367 B2 * | 11/2010 | Valentas | F27D 21/00 122/506 |
| 7,845,314 B2 | 12/2010 | Smith | |
| 7,855,267 B2 | 12/2010 | Crawford et al. | |
| 7,946,136 B2 | 5/2011 | Watkinson | |
| 8,033,254 B2 | 10/2011 | Hannum et al. | |
| 8,279,899 B2 | 10/2012 | Kitabayashi | |
| 8,285,411 B2 | 10/2012 | Hull et al. | |
| 8,402,787 B2 | 3/2013 | Pernode et al. | |
| 8,424,342 B2 | 4/2013 | Kiefer et al. | |
| 8,487,262 B2 | 7/2013 | Damm et al. | |
| 8,650,914 B2 | 2/2014 | Charbonneau | |
| 8,707,739 B2 | 4/2014 | Huber et al. | |
| 8,707,740 B2 | 4/2014 | Huber et al. | |
| 8,769,992 B2 | 7/2014 | Huber | |
| 8,858,867 B2 * | 10/2014 | Carraway | F27D 1/1816 266/241 |
| 8,875,544 B2 | 11/2014 | Charbonneau | |
| 8,973,400 B2 | 3/2015 | Charbonneau et al. | |
| 8,973,405 B2 | 3/2015 | Charbonneau et al. | |
| 8,991,215 B2 | 3/2015 | Shock et al. | |
| 8,997,525 B2 | 4/2015 | Shock et al. | |
| 9,021,838 B2 | 5/2015 | Charbonneau et al. | |
| 9,032,760 B2 | 5/2015 | Charbonneau et al. | |
| 9,096,452 B2 | 8/2015 | Charbonneau et al. | |
| 9,096,453 B2 | 8/2015 | Charbonneau | |
| 9,644,246 B2 * | 5/2017 | Elksnitis | C21C 7/10 |
| 10,246,362 B2 * | 4/2019 | Huber | F23J 15/06 |
| D880,679 S * | 4/2020 | Manasek | D23/386 |
| 10,670,261 B2 * | 6/2020 | Baker | C03B 5/2356 |
| 2001/0039813 A1 | 11/2001 | Simpson et al. | |
| 2002/0001332 A1 * | 1/2002 | Shver | H05B 7/185 373/66 |
| 2002/0086077 A1 | 7/2002 | Noller et al. | |
| 2002/0124598 A1 | 9/2002 | Borysowicz et al. | |
| 2002/0134112 A1 | 9/2002 | Barrow et al. | |
| 2002/0152770 A1 | 10/2002 | Becher et al. | |
| 2002/0162358 A1 | 11/2002 | Jeanvoine et al. | |
| 2002/0166343 A1 | 11/2002 | LeBlanc | |
| 2003/0000250 A1 | 1/2003 | Arechaga et al. | |
| 2003/0015000 A1 | 1/2003 | Hayes et al. | |
| 2003/0029197 A1 | 2/2003 | Jeanvoine et al. | |
| 2003/0037571 A1 | 2/2003 | Kobayashi et al. | |
| 2003/0053514 A1 | 3/2003 | Manasek et al. | |
| 2004/0025569 A1 | 2/2004 | Damm et al. | |
| 2004/0099009 A1 | 5/2004 | Linz et al. | |
| 2004/0128098 A1 | 7/2004 | Neuhaus et al. | |
| 2004/0131988 A1 | 7/2004 | Baker et al. | |
| 2004/0168474 A1 | 9/2004 | Jeanvoine et al. | |
| 2004/0224833 A1 | 11/2004 | Jeanvoine et al. | |
| 2005/0039491 A1 | 2/2005 | Maugendre et al. | |
| 2005/0061030 A1 | 3/2005 | Ichinose et al. | |
| 2005/0083989 A1 | 4/2005 | Leister et al. | |
| 2005/0103323 A1 | 5/2005 | Engdal | |
| 2005/0166398 A1 | 8/2005 | Weeks | |
| 2005/0236747 A1 | 10/2005 | Rue et al. | |
| 2006/0000239 A1 | 1/2006 | Jeanvoine et al. | |
| 2006/0101859 A1 | 5/2006 | Tagaki et al. | |
| 2006/0122450 A1 | 6/2006 | Kim et al. | |
| 2006/0144089 A1 | 7/2006 | Eichholz et al. | |
| 2006/0162387 A1 | 7/2006 | Schmitt et al. | |
| 2006/0174655 A1 | 8/2006 | Kobayashi et al. | |
| 2006/0177785 A1 | 8/2006 | Varagani et al. | |
| 2006/0233512 A1 | 10/2006 | Aitken et al. | |
| 2006/0257097 A1 | 11/2006 | Aitken et al. | |
| 2006/0287482 A1 | 12/2006 | Crawford et al. | |
| 2006/0293494 A1 | 12/2006 | Crawford et al. | |
| 2006/0293495 A1 | 12/2006 | Crawford et al. | |
| 2007/0000579 A1 * | 1/2007 | Pfeifenbring | F27D 1/12 148/518 |
| 2007/0051136 A1 | 3/2007 | Watkinson | |
| 2007/0106054 A1 | 5/2007 | Crawford et al. | |
| 2007/0122332 A1 | 5/2007 | Jacques et al. | |
| 2007/0130994 A1 | 6/2007 | Boratav et al. | |
| 2007/0137259 A1 | 6/2007 | Borders et al. | |
| 2007/0212546 A1 | 9/2007 | Jeanvoine et al. | |
| 2007/0220922 A1 | 9/2007 | Bauer et al. | |

(56) References Cited

U.S. PATENT DOCUMENTS

| | | |
|---|---|---|
| 2007/0266737 A1 | 11/2007 | Rodek et al. |
| 2007/0267786 A1* | 11/2007 | Higgins .............. F27B 3/225 |
| | | 266/46 |
| 2007/0278404 A1 | 12/2007 | Spanke et al. |
| 2008/0035078 A1 | 2/2008 | Li |
| 2008/0047691 A1* | 2/2008 | Taylor .............. C21C 5/4646 |
| | | 165/104.15 |
| 2008/0227615 A1 | 9/2008 | McGinnis et al. |
| 2008/0256981 A1 | 10/2008 | Jacques et al. |
| 2008/0276652 A1 | 11/2008 | Bauer et al. |
| 2008/0278404 A1 | 11/2008 | Blalock et al. |
| 2008/0293857 A1 | 11/2008 | Crawford et al. |
| 2008/0296006 A1* | 12/2008 | Manasek .............. F27D 17/004 |
| | | 165/177 |
| 2008/0302136 A1 | 12/2008 | Bauer et al. |
| 2009/0042709 A1 | 2/2009 | Jeanvoine et al. |
| 2009/0044568 A1 | 2/2009 | Lewis |
| 2009/0120133 A1 | 5/2009 | Fraley et al. |
| 2009/0176639 A1 | 7/2009 | Jacques et al. |
| 2009/0220899 A1 | 9/2009 | Spangelo et al. |
| 2009/0235695 A1 | 9/2009 | Pierrot et al. |
| 2009/0320525 A1 | 12/2009 | Johnson |
| 2010/0064732 A1 | 3/2010 | Jeanvoine et al. |
| 2010/0087574 A1 | 4/2010 | Drawford et al. |
| 2010/0089383 A1 | 4/2010 | Cowles |
| 2010/0120979 A1 | 5/2010 | Crawford et al. |
| 2010/0139325 A1 | 6/2010 | Watkinson |
| 2010/0143601 A1 | 6/2010 | Hawtof et al. |
| 2010/0162757 A1 | 7/2010 | Brodie |
| 2010/0227971 A1 | 9/2010 | Crawford et al. |
| 2010/0236323 A1 | 9/2010 | D'Angelico et al. |
| 2010/0242543 A1 | 9/2010 | Ritter et al. |
| 2010/0300153 A1 | 12/2010 | Zhang et al. |
| 2010/0304314 A1 | 12/2010 | Rouchy et al. |
| 2010/0307196 A1 | 12/2010 | Richardson |
| 2010/0313604 A1 | 12/2010 | Watson et al. |
| 2010/0319480 A1 | 12/2010 | Borders et al. |
| 2010/0326137 A1 | 12/2010 | Rouchy et al. |
| 2011/0016922 A1 | 1/2011 | Kitamura et al. |
| 2011/0048125 A1 | 3/2011 | Jackson et al. |
| 2011/0054091 A1 | 3/2011 | Crawford et al. |
| 2011/0061642 A1 | 3/2011 | Rouchy et al. |
| 2011/0088432 A1 | 4/2011 | Pumode et al. |
| 2011/0107670 A1 | 5/2011 | Galley et al. |
| 2011/0210484 A1* | 9/2011 | Lonardi .............. F27D 9/00 |
| | | 266/241 |
| 2011/0236846 A1 | 9/2011 | Rue et al. |
| 2011/0308280 A1* | 12/2011 | Huber .............. C03B 5/235 |
| | | 65/126 |
| 2012/0033792 A1 | 2/2012 | Kulik et al. |
| 2012/0077135 A1 | 3/2012 | Charbonneau |
| 2012/0104306 A1 | 5/2012 | Kamiya et al. |
| 2012/0216567 A1 | 8/2012 | Boughton et al. |
| 2012/0216568 A1 | 8/2012 | Fisher et al. |
| 2012/0216576 A1 | 8/2012 | Boughton et al. |
| 2013/0072371 A1 | 3/2013 | Jansen et al. |
| 2013/0086944 A1 | 4/2013 | Shock et al. |
| 2013/0086949 A1 | 4/2013 | Charbonneau |
| 2013/0086950 A1* | 4/2013 | Huber .............. C03B 5/167 |
| | | 65/134.5 |
| 2013/0086951 A1 | 4/2013 | Charbonneau et al. |
| 2013/0086952 A1 | 4/2013 | Charbonneau et al. |
| 2013/0123990 A1 | 5/2013 | Kulik et al. |
| 2013/0206358 A1* | 8/2013 | Maddalena .............. C21B 7/20 |
| | | 165/11.1 |
| 2013/0279532 A1 | 10/2013 | Ohmstede et al. |
| 2013/0283861 A1 | 10/2013 | Mobley et al. |
| 2013/0327092 A1* | 12/2013 | Charbonneau .............. C03B 7/06 |
| | | 65/29.21 |
| 2014/0090421 A1 | 4/2014 | Shock et al. |
| 2014/0090422 A1 | 4/2014 | Charbonneau et al. |
| 2014/0090423 A1 | 4/2014 | Charbonneau et al. |
| 2014/0144185 A1 | 5/2014 | Shock et al. |
| 2014/0208800 A1* | 7/2014 | McCann .............. C03B 5/2356 |
| | | 65/29.18 |
| 2014/0260034 A1* | 9/2014 | Ciuperca .............. E04C 2/288 |
| | | 52/405.3 |
| 2014/0333010 A1* | 11/2014 | Ciuperca .............. C04B 28/02 |
| | | 264/338 |
| 2016/0054071 A1* | 2/2016 | Cordova .............. F28D 7/0008 |
| | | 165/164 |
| 2016/0116214 A1* | 4/2016 | Kirschen .............. F27B 3/085 |
| | | 373/76 |
| 2016/0208860 A1 | 7/2016 | Balster et al. |
| 2017/0066672 A1* | 3/2017 | Huber .............. C03B 3/023 |
| 2018/0065877 A1* | 3/2018 | Faulkinbury .......... C03B 5/2356 |
| 2018/0128546 A1* | 5/2018 | Manasek .............. F27D 9/00 |
| 2018/0347905 A1* | 12/2018 | Jastrzebski .............. C21B 7/06 |
| 2020/0386648 A1* | 12/2020 | Luccini .............. F27B 3/24 |
| 2021/0009457 A1* | 1/2021 | Rash .............. C03B 5/2356 |
| 2021/0094126 A1* | 4/2021 | Egerer .............. F28F 1/08 |

FOREIGN PATENT DOCUMENTS

| | | | |
|---|---|---|---|
| DE | 11 05 116 B | 4/1961 | |
| DE | 2713257 A1 * | 9/1978 | .............. F28F 9/22 |
| DE | 36 29 965 A1 | 3/1988 | |
| DE | 40 00 358 C2 | 3/1993 | |
| DE | 44 24 814 A1 | 1/1996 | |
| DE | 196 19 919 A1 | 8/1997 | |
| DE | 100 29 983 A1 | 1/2002 | |
| DE | 100 29 983 C2 | 9/2003 | |
| DE | 10 2005 033330 B3 | 8/2006 | |
| EP | 140401 A * | 5/1985 | .............. F27D 1/12 |
| EP | 0 181 248 B1 | 10/1989 | |
| EP | 1 337 789 B1 | 12/2004 | |
| EP | 1 990 321 A1 | 11/2008 | |
| EP | 2 133 315 A1 | 12/2009 | |
| EP | 2 138 465 A2 | 12/2009 | |
| EP | 1 986 966 B1 | 4/2010 | |
| EP | 1 667 934 B1 | 2/2011 | |
| EP | 2 397 446 A2 | 12/2011 | |
| EP | 2 404 880 A1 | 1/2012 | |
| EP | 2 433 911 A1 | 3/2012 | |
| EP | 2 578 548 A2 | 4/2013 | |
| FR | 2 740 860 A1 | 9/1997 | |
| GB | 191301772 | 1/1914 | |
| GB | 191407633 | 3/1914 | |
| GB | 164073 A | 5/1921 | |
| GB | 250 536 A | 7/1926 | |
| GB | 591602 A * | 8/1947 | .............. F28D 7/08 |
| GB | 959 895 A | 6/1964 | |
| GB | 1449439 | 9/1976 | |
| GB | 1 514 317 A | 6/1978 | |
| GB | 2 424 644 A | 10/2006 | |
| IT | 1208172 | 7/1989 | |
| JP | S58 199728 A | 11/1983 | |
| JP | H08 290918 A | 11/1996 | |
| KR | 2000 0050572 A | 8/2000 | |
| KR | 100465272 B1 | 12/2004 | |
| RO | 114827 | 7/1999 | |
| SU | 986873 A1 | 7/1983 | |
| SU | 1120926 A3 * | 10/1984 | .............. F27D 1/12 |
| WO | 1998055411 A1 | 12/1998 | |
| WO | WO-2005106048 A3 * | 9/2006 | .............. F27D 1/12 |
| WO | 2008103291 A1 | 8/2008 | |
| WO | 2009091558 A1 | 7/2009 | |
| WO | 2010011701 A2 | 1/2010 | |
| WO | 2010045196 A3 | 4/2010 | |
| WO | 2012048790 A1 | 4/2012 | |
| WO | 2012125665 A1 | 9/2012 | |
| WO | 2013 162986 A1 | 10/2013 | |
| WO | 2013 188082 A1 | 12/2013 | |
| WO | 2013188167 A1 | 12/2013 | |
| WO | WO-2021028379 A1 * | 2/2021 | .............. F28F 3/12 |

OTHER PUBLICATIONS

Furman, BJ, ME 120 Experimental Methods Vibration Measurement, San Jose University Department of Mechanical and Aerospace Engineering.

(56) References Cited

OTHER PUBLICATIONS

Higley, BA, Glass Melter System Technologies for Vitrification of High-Sodium Content Low-Level, Radioactive, Liquid Wastes—Phase I: SBS Demonstration With Simulated Low-Level Waste—Final Test Report, Westinghouse Hanford Company.
Report for Treating Hanford LAW and WTP SW Simulants: Pilot Plant Mineralizing Flowsheet Apr. 2009, Department of Energy Environmental Management Consolidated Business Center by THOR Treatment Technologies, LLC.
Gerber, J., "Les Densimetres Industriels," Petrole et Techniques, Association Francaise des Techniciens du Petrole, Jun. 1, 1989, pp. 26-27, No. 349, Paris, France.
Rue et al, "Submerged Combustion Melting of Glass," International Journal of Applied Glass Science, Nov. 9, 2011, pp. 262-274, vol. 2, No. 4.
National Laboratory, US DOE Contract No. DE-AC09-08SR22470, Oct. 2011.
"AccuTru Temperature Measurement," AccuTru International Corporation, 2003.
"Glass Technologies—The Legacy of a Successful Public-Private Partnership", 2007, U.S. Department of Energy, pp. 1-32.
"Glass Melting Technology—A Technical and Economic Assessment," 2004, U.S. Department of Energy, pp. 1-292.
Muijsenberg, H. P. H., Neff, G., Muller, J., Chmelar, J., Bodi, R. and Matustikj, F. (2008) "An Advanced Control System to Increase Glass Quality and Glass Production Yields Based on GS ESLLI Technology", in A Collection of Papers Presented at the 66th Conference on Glass Problems: Ceramic Engineering and Science Proceedings, vol. 27, Issue 1 (ed W. M. Kriven), John Wiley & Sons, Inc., Hoboken, NJ, USA. doi: 10.1002/9780470291306.ch3.
Rue, "Energy-Efficient Glass Melting—The Next Generation Melter", Gas Technology Institute, Project No. 20621 Final Report (2008).
Muijsenberg, E., Eisenga, M. and Buchmayer, J. (2010) "Increase of Glass Production Efficiency and Energy Efficiency with Model-Based Predictive Control", in 70th Conference on Glass Problems: Ceramic Engineering and Science Proceedings, vol. 31, Issue 1 (ed C. H. Drummond), John Wiley & Sons, Inc., Hoboken, NJ, USA. doi: 10.1002/9780470769843.ch15.

Sims, Richard, "Batch charging technologies—a review", www.glassonweb.com, Nikolaus Sorg Gmbh & Co KG (May 2011).
"Canty Process Technology" brochure, date unknown, copy received in Apr. 2012 at American Institute of Chemical Engineers, Spring Meeting, Houston, TX.
"Glass Melting", Battelle PNNL MST Handbook, U.S. Department of Energy, Pacific Northwest Laboratory, retrieved from the Internet Apr. 20, 2012.
"Roll Compaction", brochure from The Fitzpatrick Company, Elmhurst, Illinois, retrieved from the Internet Apr. 20, 2012.
"Glass Industry of the Future", United States Department of Energy, report 02-GA50113-03, pp. 1-17, Sep. 30, 2008.
Stevenson, "Foam Engineering: Fundamentals and Applications", Chapter 16, pp. 336-389, John Wiley & Sons (Mar. 13, 2012).
Clare et al., "Density and Surface Tension of Borate Containing Silicate Melts", Glass Technology—European Journal of Glass Science and Technology, Part A, pp. 59-62, vol. 44, No. 2, Apr. 1, 2003.
Seward, T.P., "Modeling of Glass Making Processes for Improved Efficiency", DE-FG07-96EE41262, Final Report, Mar. 31, 2003.
Conradt et al, Foaming behavior on glass melts, Glastechniche Berichte 60 (1987) Nr. 6, S. 189-201 Abstract Fraunhofer ISC.
Kim et al., "Foaming in Glass Melts Produced by Sodium Sulfate Decomposition under Isothermal Conditions", Journal of the American Ceramic Society, 74(3), pp. 551-555, 1991.
Kim et al., "Foaming in Glass Melts Produced by Sodium Sulfate Decomposition under Ramp Heating Conditions", Journal of the American Ceramic Society, 75(11), pp. 2959-2963, 1992.
Kim et al., "Effect of Furnace Atmosphere on E-glass Foaming", Journal of Non-Crystalline Solids, 352(50/51), pp. 5287-5295, 2006.
Van Limpt et al., "Modelling the evaporation of boron species. Part 1. Alkali-free borosilicate glass melts", Glass Technology—European Journal of Glass Science and Technology, Part A, 52(3): pp. 77-87, 2011.
Olabin, V.M. et al, "Submerged Combustion Furnace for Glass Melts," Ceramic Engineering and Science Proceedings, Jan. 1, 1996, pp. 84-92, vol. 17—No. 2, American Ceramic Society Inc., US.

\* cited by examiner

CONTINUOUS FLOW SUBMERGED COMBUSTION MELTER COOLING WALL PANELS, SUBMERGED COMBUSTION MELTERS, AND METHODS OF USING SAME

CROSS-REFERENCE TO RELATED APPLICATIONS

This application is a Division of pending U.S. application Ser. No. 15/247,515 filed Aug. 25, 2016, now U.S. Pat. No. 10,301,208 issued May 28, 2019. The entire contents of the above-identified application is incorporated by reference for all purposes. This application is related to Applicant's U.S. Patent Nos. 8,769,992, issued Jul. 8, 2014; 9,505,646, issued Nov. 29, 2016; and 9,643,870, issued May 9, 2017, all incorporated herein by reference.

BACKGROUND INFORMATION

Technical Field

The present disclosure relates to systems and methods for manufacture of glass products, mineral wool, rock wool, and other non-metallic inorganic materials using submerged combustion melters.

Background Art

Submerged combustion melting (SCM) involves melting glass-forming materials, mineral wool forming materials, rock wool forming materials, and other non-metallic inorganic feedstock materials to produce molten materials by passing oxygen, oxygen-air mixtures or air along with a liquid, gaseous fuel, or particulate fuel directly into a molten or semi-molten pool of material, usually through burners submerged in a melt pool. The introduction of high flow rates of oxidant and fuel into the molten material, and the expansion of the gases cause rapid melting of the feedstock and much turbulence. Splashing of the molten vitreous mass inside the SCM is a phenomenon unique to the SCM. While aggressive mixing and turbulence are desired for reducing time to melt feedstock, this splashing (where molten material actually breaks away from the turbulent surface and travels upward and then falls back down into the vitreous mass by gravity, or strikes the ceiling or walls of the SCM and drips back down into the molten mass, or solidifies thereon) causes significant strain on the materials of construction, such as fluid-cooled wall panels. This strain may open up unwanted passages in semi-continuous welded channels in traditional fluid-cooled (usually liquid-cooled) panels and allow cooling fluid to bypass sections of the panel. This may lead to boiling of the cooling liquid in the bypassed sections and the buildup of condensed material (solids) found in the cooling liquid that further may restrict cooling liquid flow.

It would be an advance in the SCM art if these bypassed sections in fluid-cooled panels could be reduced or eliminated.

SUMMARY

In accordance with the present disclosure, systems and methods are described which reduce or overcome one or more of the above problems.

A first aspect of the disclosure is a continuous flow submerged combustion melter cooling wall panel, in certain embodiments comprising (consisting essentially of, or consisting of):

a primary metal plate (preferably selected from carbon steel, stainless steel, or combinations thereof) having length (L), a width (W), first and second major surfaces, and a perimeter edge;

a plurality of substantially 90 degree metal (either same or different than the primary metal plate, preferably carbon steel, stainless steel, or combination thereof) pieces welded to the primary metal plate in parallel configuration, each of the substantially 90 degree metal pieces comprising first and second metal leg plates configured to form a substantially 90 degree vertex therebetween, each metal leg plate having an edge distal to the vertex, the distal edge of the first metal leg plate welded to the first major surface of the primary metal plate, the distal edge of the second metal leg plate welded to the vertex of an adjacent substantially 90 degree metal piece;

each of the plurality of substantially 90 degree metal pieces having a length (l) such that l<L, and each welded to the primary metal plate in staggered configuration to form, along with first and second end plates and a seal plate, a serpentine continuous flow coolant channel.

Certain other continuous flow submerged combustion melter cooling wall panels comprise (consist essentially of, or consist of):

a primary metal plate having length (L), a width (W), first and second major surfaces, and a perimeter edge;

a plurality of substantially 90 degree metal pieces welded to the primary metal plate in parallel configuration, each of the substantially 90 degree metal pieces comprising first and second metal leg plates configured to form a substantially 90 degree vertex therebetween, each metal leg plate having an edge distal to the vertex, the distal edge of the first metal leg plate welded to the first major surface of the primary metal plate, the distal edge of the second metal leg plate welded to the vertex of an adjacent substantially 90 degree metal piece;

each of the plurality of substantially 90 degree metal pieces having a length (l) such that l=L, and each welded to the primary metal plate to form, along with first and second end plates, a plurality of substantially parallel, equal length coolant flow channels; and a plurality of conduits fluidly connecting adjacent ends of the flow passages through the first and second end plates (or alternatively through the second leg of the substantially 90 degree metal pieces) and configured to form a serpentine continuous coolant flow channel.

Certain other continuous flow submerged combustion melter cooling wall panels comprise (or consist essentially of, or consist of):

a one piece milled metal plate having a length (L), width (W), a longitudinal axis, a thickness (T), first and second major surfaces, and a perimeter edge, the one piece milled metal plate comprising a plurality of substantially parallel, equal length coolant flow channels milled or formed therein substantially parallel to longitudinal axis and not intersecting from a first end to a second end of the one piece milled metal plate, and adjacent coolant flow channels connected at respective ends by a plurality of conduits fluidly connecting adjacent ends of the adjacent coolant flow channels and configured to form a serpentine continuous coolant flow channel.

Still other continuous flow submerged combustion melter cooling wall panels comprise (or consist essentially of, or consist of):

a one piece milled metal (pref. carbon steel) plate having a length (L), width (W), a longitudinal axis, a thickness (T), first and second major surfaces, and a perimeter edge, the one piece milled metal plate comprising a plurality of non-through passages milled or formed therein substantially parallel to the longitudinal axis and not intersecting from a first end to the second end of the plate, the milled or formed non-through passages configured such that they extend from one minor edge of the plate to greater than 80 percent but not more than 99 percent of the length (L), adjacent through passages connected by surface conduits fluidly connected to the non-through passages by a plurality of connecting passages extending from one major surface to each of the non-through passages, and configured to produce a continuous coolant fluid flow passage through the plate.

A second aspect of the disclosure is a submerged combustion melter comprising (consisting of or consisting essentially of) one or more continuous flow submerged combustion melter cooling wall panels of the first aspect of this disclosure in either the roof, the sidewall structure, or both.

A third aspect of the disclosure is a method of producing molten inorganic product comprising feeding one or more feedstocks to an SCM of the second aspect of this disclosure.

Continuous flow submerged combustion melter cooling wall panels, SCMs, and methods of the disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached drawings in which.

Figure 1:
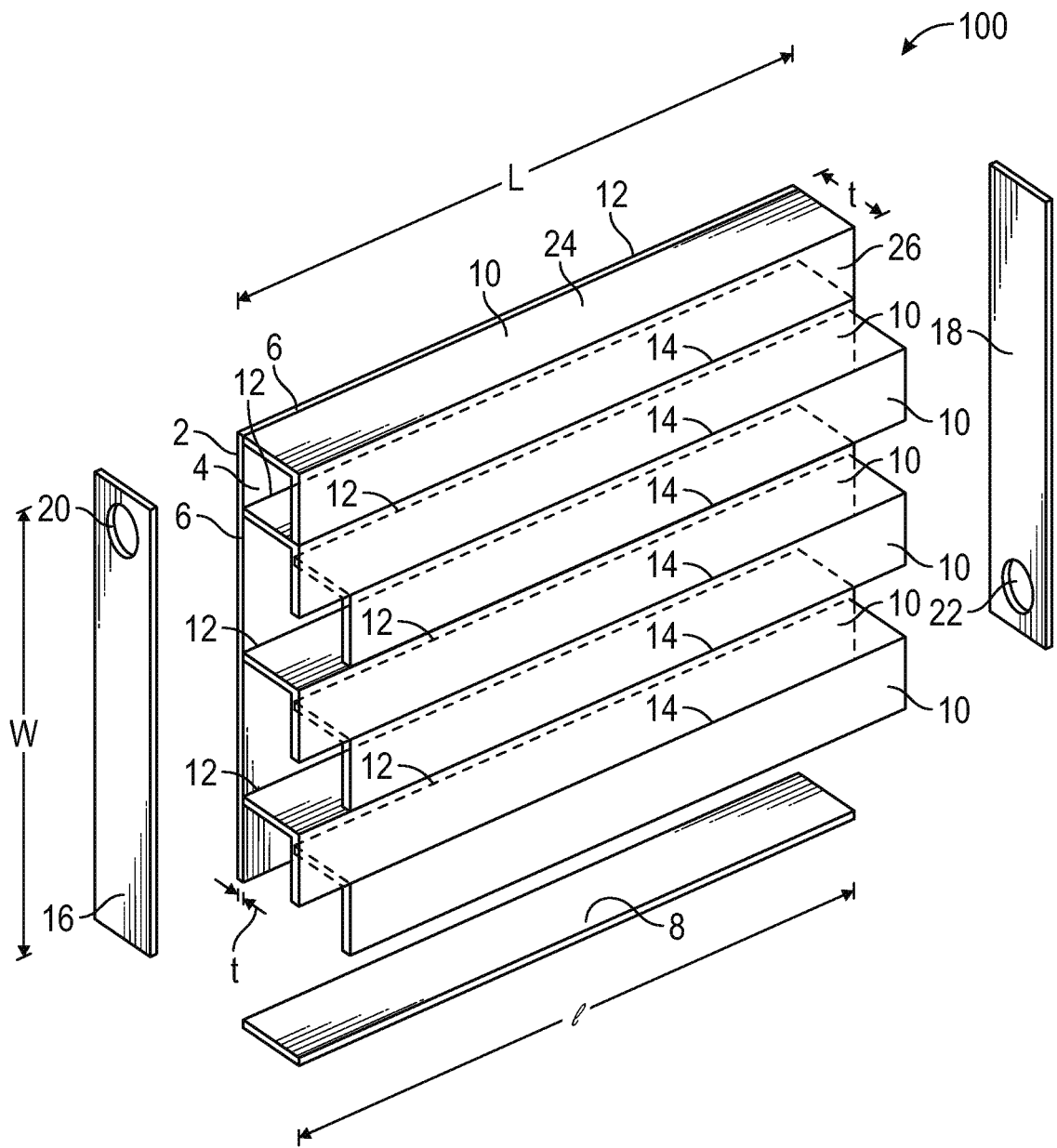
FIG. 1 is a schematic perspective view of one embodiment of a fluid-cooled panel of this disclosure.

It is to be noted however that the appended drawings are not to scale and illustrate only typical embodiments of this disclosure and are therefore not to be considered limiting of its scope, for the disclosure may admit to other equally effective embodiments.

DETAILED DESCRIPTION

In the following description, numerous details are set forth to provide an understanding of the disclosed burners, burner panels, SCMs, and methods. However, it will be understood by those skilled in the art that the apparatus and methods covered by the claims may be practiced without these details and that numerous variations or modifications from the specifically described embodiments may be possible and are deemed within the claims. For example, wherever the term "comprising" is used, embodiments and/or components where "consisting essentially of" and "consisting of" are also explicitly disclosed herein and are part of this disclosure. An example of "consisting essentially of" may be with respect to the composition of a burner conduit: a conduit consisting essentially of carbon steel means there may be a minor portions or trace amounts of metals, oxides, and other chemical species that are noble metals, such chromium, platinum, and the like, and a conduit consisting essentially of noble metal may have trace amounts of iron, iron oxides, carbon, and other metal oxides. An example of "consisting of" may be a burner made up of components that are one or more carbon steels and no noble metals or ceramic materials, or conduits made up of only noble metals. Another example of "consisting essentially of" may be with respect to particulate feedstock that consists essentially of inorganic feedstock, meaning that a minor portion, perhaps up to 10, or up to 5, or up to 4, or up to 3, or up to 2, or up to 1 wt. percent may be organic. An example of methods and systems using the transition phrase "consisting of" includes those where only burners having liquid-cooled jackets are used, with no gas-cooled jackets, or vice versa. The term "comprising" and derivatives thereof is not intended to exclude the presence of any additional component, step or procedure, whether or not the same is disclosed herein. In order to avoid any doubt, all compositions, apparatus, systems, and methods claimed herein through use of the term "comprising" may include any additional component, step, or procedure unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percentages are based on weight and all test methods are current as of the filing date hereof. The acronym "ASTM" means ASTM International, 100 Barr Harbor Drive, PO Box C700, West Conshohocken, Pa., 19428-2959 USA.

All numbers, including degree angles, disclosed herein are approximate values, regardless whether the word "about" or "approximate" is used in connection therewith. They may vary by 1%, 2%, 5%, and sometimes, 10 to 20%. Whenever a numerical range with a lower limit, RL and an upper limit, RU, is disclosed, any number falling within the range is specifically disclosed. In particular, the following numbers within the range are specifically disclosed: R=RL+k*(RU−RL), wherein k is a variable ranging from 1% to 100% with a 1% increment, i.e., k is 1%, 2%, 3%, 4%, 5%, . . . , 50%, 51%, 52%, . . . , 95%, 96%, 97%, 98%, 99%, or 100%. Moreover, any numerical range defined by two R numbers as defined in the above is also specifically disclosed.

All U.S. patent applications and U.S. patents referenced herein are hereby explicitly incorporated herein by reference. In the event definitions of terms in the referenced patents and applications conflict with how those terms are defined in the present application, the definitions for those terms that are provided in the present application shall be deemed controlling. All percentages herein are based on weight unless otherwise specified.

As explained briefly in the Background, one drawback to submerged combustion is splashing of the molten vitreous mass inside the SCM, a phenomenon unique to the SCM. While aggressive mixing and turbulence are desired for reducing time to melt feedstock, this splashing causes significant strain on the materials of construction, such as fluid-cooled. wall panels. This strain may open up unwanted passages in semi-continuous welded channels in traditional fluid-cooled (usually liquid-cooled) panels and allow cooling fluid to bypass sections of the panel. This may lead to boiling of the cooling liquid in the bypassed sections and the buildup of condensed material (solids) found in the cooling liquid that further may restrict cooling liquid flow.

Applicant has discovered fluid-cooled panels, systems and methods that may reduce or eliminate such problems.

Various terms are used throughout this disclosure. "Submerged" as used herein means that combustion gases emanate from burner tips under the level of the molten material; submerged combustion ("SC") burners may be floor-mounted, wall-mounted, roof-mounted, or in melter embodiments comprising more than one submerged combustion burner, any combination thereof (for example, two floor mounted burners and one wall mounted burner). "Wall" includes sidewalls and end wall unless otherwise noted.

The terms "foam" and "foamy" include froths, spume, suds, heads, fluffs, fizzes, lathers, effervesces, layer and the like. The term "bubble" means a thin, shaped, gas-filled film of molten material. The bubble shape may be spherical, hemispherical, rectangular, ovoid, and the like. Gas in the gas-filled bubbles may comprise oxygen or other oxidants, nitrogen, argon, noble gases, combustion products (including but not limited to, carbon dioxide, carbon monoxide, $NO_x$, $SO_x$, $H_2S$, and water), reaction products of glass-forming ingredients (for example, but not limited to, sand (primarily $SiO_2$), clay, limestone (primarily $CaCO_3$), burnt dolomitic lime, borax and boric acid, and the like, or reaction products of other feedstocks being melted, such as rock and minerals. Bubbles may include solids particles, for example soot particles, either in the film, the gas inside the film, or both.

As used herein the term "combustion gases" means substantially gaseous mixtures of combusted fuel, any excess oxidant, and combustion products, such as oxides of carbon (such as carbon monoxide, carbon dioxide), oxides of nitrogen, oxides of sulfur, and water. Combustion products may include liquids and solids, for example soot and unburned liquid fuels.

"Oxidant" as used herein includes air and gases having the same molar concentration of oxygen as air, oxygen-enriched air (air having oxygen concentration of oxygen greater than 21 mole percent), and "pure" oxygen, such as industrial grade oxygen, food grade oxygen, and cryogenic oxygen. Oxygen-enriched air may have 50 mole percent or more oxygen, and in certain embodiments may be 90 mole percent or more oxygen. Oxidants may be supplied from a pipeline, cylinders, storage facility, cryogenic air separation unit, membrane permeation separator, or adsorption unit.

The term "fuel", according to this disclosure, means a combustible composition comprising a major portion of, for example, methane, natural gas, liquefied natural gas, propane, atomized oil or the like (either in gaseous or liquid form). Fuels useful in the disclosure may comprise minor amounts of non-fuels therein, including oxidants, for purposes such as premixing the fuel with the oxidant, or atomizing liquid fuels. As used herein the term "fuel" includes gaseous fuels, liquid fuels, flowable solids, such as powdered carbon or particulate material, waste materials, slurries, and mixtures or other combinations thereof. When the fuel comprises gaseous fuel, the gaseous fuel may be selected from the group consisting of methane, natural gas, liquefied natural gas, propane, carbon monoxide, hydrogen, steam-reformed natural gas, atomized oil or mixtures thereof.

The sources of oxidant and fuel may be one or more conduits, pipelines, storage facility, cylinders, or, in embodiments where the oxidant is air, ambient air. Oxygen-enriched oxidants may be supplied from a pipeline, cylinder, storage facility, cryogenic air separation unit, membrane permeation separator, or adsorption unit such as a vacuum swing adsorption unit.

Continuous flow submerged combustion melter cooling wall panel metal plates, various conduits, such as coolant, oxidant and fuel conduits, spacers, burner tip walls and crowns, feedstock supply conduits, and SCM exhaust conduits may be comprised of metal, ceramic, ceramic-lined metal, or combination thereof. Suitable metals include carbon steels, stainless steels, for example, but not limited to, 306 and 316 steel, as well as titanium alloys, aluminum alloys, and the like. High-strength materials like C-110 and C-125 metallurgies that are NACE qualified may be employed for burner body components. (As used herein, "NACE" refers to the corrosion prevention organization formerly known as the National Association of Corrosion Engineers, now operating under the name NACE International, Houston, Tex.) Use of high strength steel and other high strength materials may significantly reduce the conduit wall thickness required, reducing weight of the conduits and/or space required for conduits. In certain locations, precious metals and/or noble metals (or alloys) may be used for portions or all of these conduits. Noble metals and/or other exotic corrosion and/or fatigue-resistant materials such as platinum (Pt), ruthenium (Ru), rhodium (Rh), palladium (Pd), silver (Ag), osmium (Os), iridium (Ir), and gold (Au); alloys of two or more noble metals; and alloys of one or more noble metals with a base metal may be employed. In certain embodiments a protective layer or layers or components may comprise an 80 wt. percent platinum/20 wt. percent rhodium alloy attached to a base metal using brazing, welding or soldering of certain regions, as further explained in Applicant's U.S. Pat. No. 10,131,563, issued Nov. 20, 2018. In certain embodiments carbon steel metal plates and conduits may be preferred as a low cost option.

The choice of a particular material is dictated among other parameters by the chemistry, pressure, and temperature of fuel and oxidant used and type of melt to be produced with certain feedstocks. The skilled artisan, having knowledge of the particular application, pressures, temperatures, and available materials, will be able design the most cost effective, safe, and operable heat transfer substructures, feedstock and exhaust conduits, burners, burner panels, and melters for each particular application without undue experimentation.

"Conduits" need not have a circular cross-section. SCMs need not have a rectangular cross-section or floor plan. The term "hydraulic diameter" means $D_H=4A/P$, where A is the cross-sectional area, and P is the wetted perimeter of the cross-section. Hydraulic diameter is mainly used for calculations involving turbulent flow, and for calculating Reynolds number, $Re = \rho u L/\rho$, where $L = D_H$,
$\mu$ = viscosity,
$\rho$ = density, and
$u$ = velocity.

Secondary flows (for example, eddies) can be observed in non-circular conduits and vessels as a result of turbulent shear stress in the fluid flowing through the conduit or vessel experiencing turbulent flow. Hydraulic diameter is also used in calculation of heat transfer in internal flow problems. For a circular cross-section conduit, $D_H$ equals the diameter of the circle. For an annulus, $D_H$ equals $D_o - D_i$, where $D_o$ and $D_i$ are the annulus outer diameter and inner diameter, respectively. For a square conduit having a side length of a, the $D_H$ equals a. For a fully filled conduit whose cross section is a regular polygon, the hydraulic diameter is equivalent to the diameter of a circle inscribed within the wetted perimeter. "Turbulent conditions" means having a Re>4000, or greater than 5000, or greater than 10,000, or greater than 20,000 or higher. The phrase "the oxidant experiences a flow that is turbulent" means the oxidant is flowing in turbulent manner as it leaves the annulus and for a short distance (1 or 2 cm) thereafter so that eddies are maintained and contribute to the bubble bursting effect. The phrase "turbulent conditions in substantially all of the material being melted" means that the SC burners and the SCM are configured so that there may be some regions near the wall and floor of the SCM where the material being melted will be in transient or laminar flow as measured by Re, but the majority (perhaps greater than 51%, or greater than 55%, or greater than 6%, or greater than 65%, or greater than 70%, or greater than 75%, or greater than 80% of the material being melted will be experiencing turbulent flow. Transient flow is defined as 2300<Re<4000, and laminar flow is defined as Re<2300. The phrase "ejected portions of melted material" means portions of the material being melted (or completely molten material) that actually separate from the splash zone and travel generally upward toward the SCM ceiling, or toward the SCM walls above the splash zone, and even up into the exhaust structure, then either solidify or drip back down into the melt, or fall back into the melt after an arcuate path upward, reaching a maximum, then falling back into the melt, as in projectile motion.

Suitable materials for refractory fluid-cooled panels and SCM and flow channel refractory liners are fused zirconia ($ZrO_2$), fused cast AZS (alumina-zirconia-silica), rebonded AZS, or fused cast alumina ($Al_2O_3$). The geometry of the burner, SCM, or flow channel, and composition of molten material to be produced may dictate the choice of a particular material, among other parameters. Such refractory lining materials may include ceramics such as, but not limited to, alumina and silicon nitride, refractory materials such as, but not limited to, chrome-containing or zircon-based refractory metals, and noble metals, or mixtures or combinations thereof.

The term "fluid-cooled" means use of any coolant fluid (heat transfer fluid) to transfer heat away from the equipment in question, other than ambient air that resides naturally on the outside of the equipment. For example, portions of or the entire panels of sidewall structure, floor, and ceiling of the SCM and flow channels, skimmers, baffles, portions or all of heat transfer substructures used to preheat feedstock (for example nearest the melter), portions of feedstock supply conduits, and portions of SC burners, and the like may require fluid cooling. The terms "cooled" and "coolant" may include use of any heat transfer fluid and may be any gaseous, liquid, slurry, or some combination of gaseous, liquid, and slurry compositions that functions or is capable of being modified to function as a heat transfer fluid. Gaseous heat transfer fluids may be selected from air, including ambient air and treated air (for example, air treated to remove moisture), inorganic gases, such as nitrogen, argon, and helium, organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids may be selected from liquids that may be organic, inorganic, or some combination thereof, for example, salt solutions, glycol solutions, oils and the like. Other possible heat transfer fluids include steam (if cooler than the expected glass melt temperature), carbon dioxide, or mixtures thereof with nitrogen. Heat transfer fluids may be compositions comprising both gas and liquid phases, such as the higher chlorofluorocarbons. Certain SCMs and method embodiments of this disclosure may include fluid-cooled panels such as disclosed in Applicant's U.S. Pat. No. 8,769,992.

Certain continuous flow submerged combustion melter cooling wall panels of this disclosure may comprise (or consist essentially of, or consist of):

a primary metal (pref. carbon steel) plate having length (L), a width (W), first and second major surfaces, and a perimeter edge;

a plurality (N) of substantially 90 degree metal (pref. carbon steel) pieces welded to the primary metal plate in parallel configuration, each of the substantially 90 degree metal pieces comprising first and second metal leg plates configured to form a substantially 90 degree vertex therebetween, each metal leg plate having an edge distal to the vertex, the distal edge of the first metal leg plate welded to the first major surface of the primary metal plate, the distal edge of the second metal leg plate welded to the vertex of an adjacent substantially 90 degree metal piece;

N−1 of the plurality of substantially 90 degree metal pieces having a length (l) such that l<L, and each welded to the primary metal plate in staggered configuration to form, along with first and second end plates, a seal plate, and one substantially 90 degree metal piece having l=L, a serpentine continuous flow coolant channel.

Certain continuous flow submerged combustion melter cooling wall panels include those wherein the first and second end plates are welded to respective first and second portions of the perimeter edge of the primary metal plate and to ends of alternating ones of the substantially 90 degree metal pieces and to first and second ends of the seal plate. Certain continuous flow submerged combustion melter cooling wall panels include those wherein the first and second end plates are substantially 90 degree formed, machined, or bent end portions of the primary metal plate, and the seal plate is welded to an edge formed by the primary metal plate and the first and second end plates. Certain continuous flow submerged combustion melter cooling wall panels include those of wherein the first and second end plates are substantially 90 degree formed, machined, or bent end peripheral portions of the primary metal plate, and the seal plate is a substantially 90 degree formed, machined, or bent side peripheral portion of the primary metal plate, the seal plate having minor edges welded to minor edges of the first and second end plates. Certain continuous flow submerged combustion melter cooling wall panels include those wherein the plurality of substantially 90 degree metal pieces are each angle iron bent to an L-shape to form the first and second metal legs. Certain continuous flow submerged combustion melter cooling wall panels include those wherein the first and second metal leg plates are substantially equal in length. Certain continuous flow submerged combustion melter cooling wall panels include those wherein at least one of the plurality of substantially 90 degree metal pieces are configured to form at least one internal baffle. Certain continuous flow submerged combustion melter cooling wall panels include those having an arcuate shape viewed in plan. Certain continuous flow submerged combustion melter cooling wall panels include those having at least one additional layer attached to the panel away from the primary metal plate, the at least one additional layer selected form the group consisting of refractory, another layer of substantially 90 degree metal pieces welded to the plurality of substantially 90 degree metal pieces, and combinations thereof. Certain continuous flow submerged combustion melter cooling wall panels include those having at least one opening for positioning of a submerged combustion burner therein.

Certain continuous flow submerged combustion melter cooling wall panels may comprise (or consist essentially of, or consist of):

a primary metal plate having length (L), a width (W), first and second major surfaces, and a perimeter edge;

a plurality of substantially 90 degree metal pieces welded to the primary metal plate in parallel configuration, each of the substantially 90 degree metal pieces comprising first and second metal leg plates configured to form a substantially 90 degree vertex therebetween, each metal leg plate having an edge distal to the vertex, the distal edge of the first metal leg plate welded to the first major surface of the primary metal plate, the distal edge of the second metal leg plate welded to the vertex of an adjacent substantially 90 degree metal piece;

each of the plurality of substantially 90 degree metal pieces having a length (l) such that l=L, and each welded to the primary metal plate to form, along with first and second end plates and a seal plate, a plurality of substantially parallel, equal length coolant flow channels; and a plurality of conduits fluidly connecting adjacent ends of the flow passages through the first and second end plates and configured to form a serpentine continuous coolant flow channel.

Certain continuous flow submerged combustion melter cooling wall panels may comprise (or consist essentially of, or consist of):

a primary metal plate having length (L), a width (W), first and second major surfaces, and a perimeter edge;

a plurality of substantially 90 degree metal pieces welded to the primary metal plate in parallel configuration, each of the substantially 90 degree metal pieces comprising first and second metal leg plates configured to form a substantially 90 degree vertex therebetween, each metal leg plate having an edge distal to the vertex, the distal edge of the first metal leg plate welded to the first major surface of the primary metal plate, the distal edge of the second metal leg plate welded to the vertex of an adjacent substantially 90 degree metal piece;

each of the plurality of substantially 90 degree metal pieces having a length (l) such that l=L, and each welded to the primary metal plate to form, along with first and second end plates and a seal plate, a plurality of substantially parallel, equal length coolant flow channels; and a plurality of conduits fluidly connecting adjacent ends of the flow passages through the second metal leg of the a plurality of substantially 90 degree metal pieces and configured to form a serpentine continuous coolant flow channel.

Certain continuous flow submerged combustion melter cooling wall panels may comprise (or consist essentially of, or consist of):

a one piece milled metal (pref. carbon steel) plate having a length (L), width (W), a longitudinal axis, a thickness (T), first and second major surfaces, and a perimeter edge, the one piece milled metal plate comprising a plurality of substantially parallel, equal length coolant flow channels milled or formed therein substantially parallel to longitudinal axis and not intersecting from a first end to a second end of the one piece milled metal plate, and adjacent coolant flow channels connected at respective ends by a plurality of conduits fluidly connecting adjacent ends of the adjacent coolant flow channels and configured to form, a serpentine continuous coolant flow channel.

Certain continuous flow submerged combustion melter cooling wall panels include those wherein each of the coolant flow channels has a diameter (D) less than (T) with the proviso that D is 1 inch or greater. Certain continuous flow submerged combustion melter cooling wall panels may include those wherein each of the coolant flow channels are substantially identical in diameter, length and shape. Certain continuous flow submerged combustion melter cooling wall panels include those wherein the coolant flow channels are separated by distance of no more than 3 inches (or no more than 2 inches, or no more than 1 inch, or no more than 0.5 inch). Certain continuous flow submerged combustion melter cooling wall panels include those wherein the coolant flow channels have a cross-section selected from the group consisting of circular, semi-circular, polygonal, trapezoidal, triangular, irregular, and combinations thereof. Certain continuous flow submerged combustion melter cooling wall panels include those having an arcuate shape viewed in plan. Certain continuous flow submerged combustion melter cooling wall panels include those having at least one additional layer attached to the one piece milled metal plate, the at least one additional layer selected from the group consisting of refractory, a second one piece milled metal plate, and combinations thereof. Certain continuous flow submerged combustion melter cooling wall panels include those having at least one opening for positioning of a submerged combustion burner therein.

Certain continuous flow submerged combustion melter cooling wall panels may comprise (or consist essentially of, or consist of):

a one piece milled metal (pref. carbon steel) plate having a length (L), width (W), a longitudinal axis, a thickness (T), first and second major surfaces, and a perimeter edge, the one piece milled metal plate comprising a plurality of non-through passages milled or formed therein substantially parallel to the longitudinal axis and not intersecting from a first end to the second end of the plate, the milled or formed non-through passages configured such that they extend from one minor edge of the plate to greater than 80 percent but not more than 99 percent of the length (L), adjacent through passages connected by surface conduits fluidly connected to the non-through passages by a plurality of connecting passages extending from one major surface to each of the non-through passages, and configured to produce a continuous coolant fluid flow passage through the plate.

Submerged combustion melters may comprise (or consist of, or consisting essentially of) one or more continuous flow submerged combustion melter cooling wall panels of this disclosure in the SCM floor, roof, the sidewall structure, or any combination of these.

Methods of producing molten inorganic product comprising feeding one or more feedstocks to an SCM of this disclosure, melting the feedstock using turbulent submerged combustion, and discharging the molten inorganic product from the SCM are considered another aspect of this disclosure. Methods comprising routing warmed coolant from one or more of the continuous flow submerged combustion melter cooling wall panels of this disclosure installed in an SCM to a feedstock preheater, a fuel preheater, an oxidant preheater, or combination thereof, are considered another aspect of this disclosure.

Specific non-limiting apparatus, system and method embodiments in accordance with the present disclosure will now be presented in conjunction with FIGS. 1-9. The same numerals are used for the same or similar features in the various figures. In the views illustrated in FIGS. 1-8, it will be understood in each case that the figures are schematic in nature, and certain conventional features are not illustrated in order to illustrate more clearly the key features of each embodiment.

FIGS. 1-5 are schematic exploded perspective views illustrating five embodiments 100, 200, 300, 400, and 500, respectively, of continuous flow submerged combustion melter cooling wall panels of this disclosure (preferably liquid-cooled, preferably water-cooled). Embodiment 100 illustrating schematically in FIG. 1 features a primary metal plate 2 having a length (L), width (W), and thickness (t), having a first major surface 4 and a second major surface (not illustrated) opposite surface 4, and a perimeter edge 6. A seal plate 8, a plurality of substantially 90 degree metal pieces 10, and first and second end plates 16, 18 are welded together to form the final structure having a length (L), width (W), and thickness (T). Only welds 12 and 14 are illustrated, welds 12 forming a plurality of junctions of a plurality of first metal leg plates 24 and primary metal plate 2, while welds 14 form a plurality of junctions between distal ends of a plurality of second metal leg plates 26, as indicated. Embodiment 100 is characterized primarily by all but one of the substantially 90 degree metal pieces having a length (l) such that l<L, and the substantially 90 degree metal pieces are offset such that when coolant is introduced through inlet port 22 the coolant follows a serpentine path through the structure until exiting through outlet port 20. It will easily be recognized that the coolant flow direction could be reversed in certain embodiments.

Figure 2:
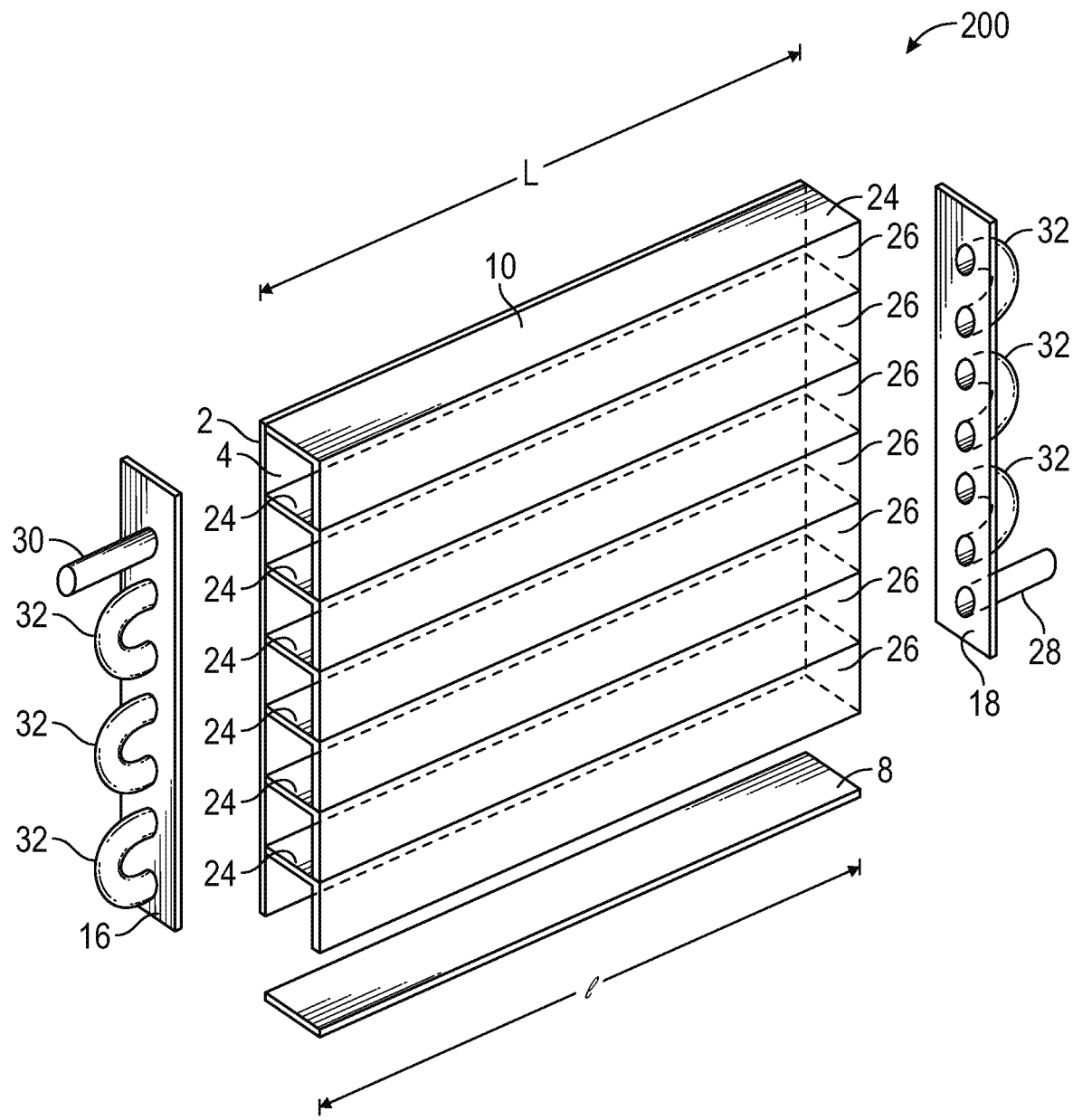
FIG. 2 is a schematic cross-sectional view of the burner of FIG. 1 along the line A-A.
Figure 3:
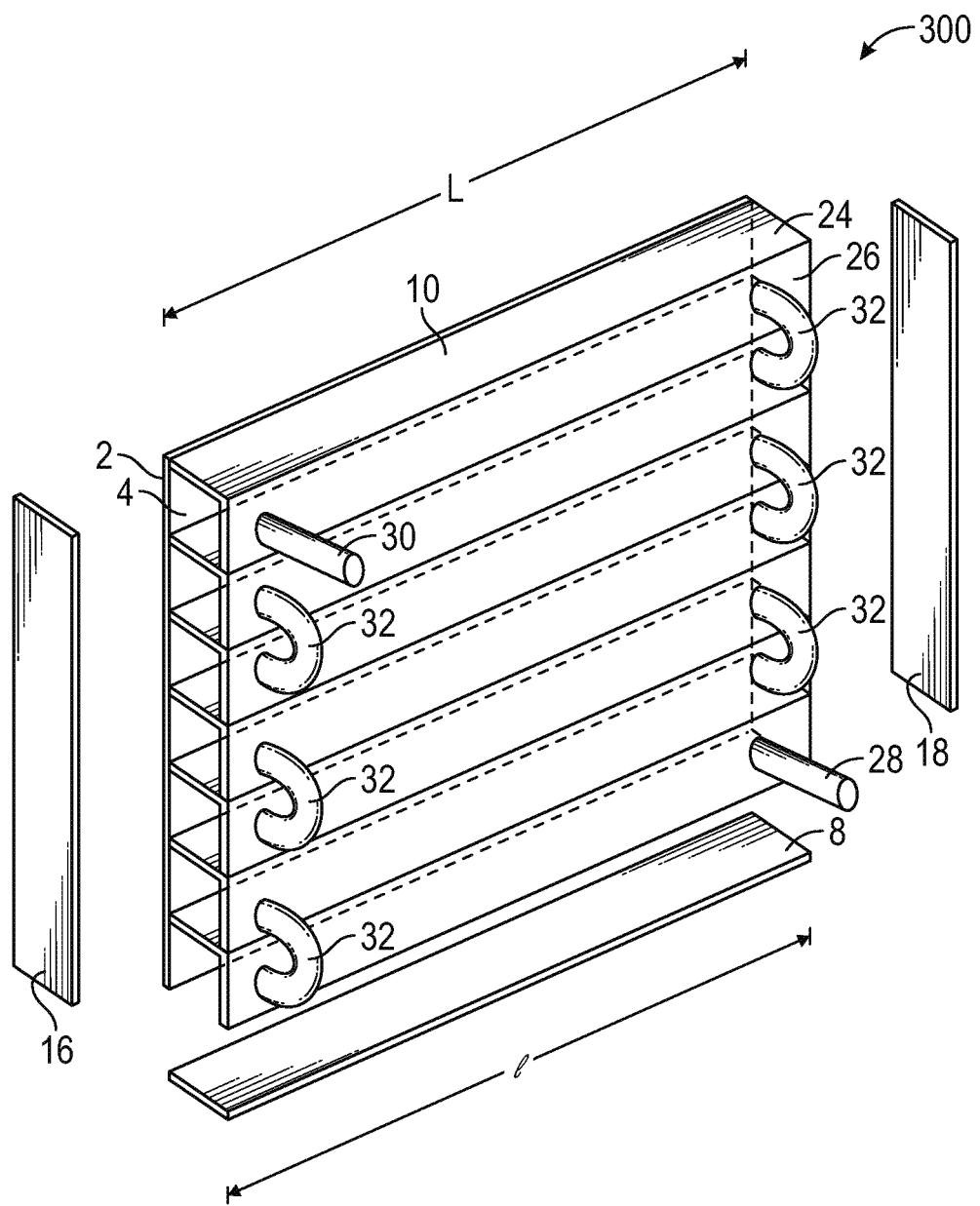
FIG. 3 is a schematic cross-sectional view of the top portion of the burner of FIG. 1.
Figure 4:
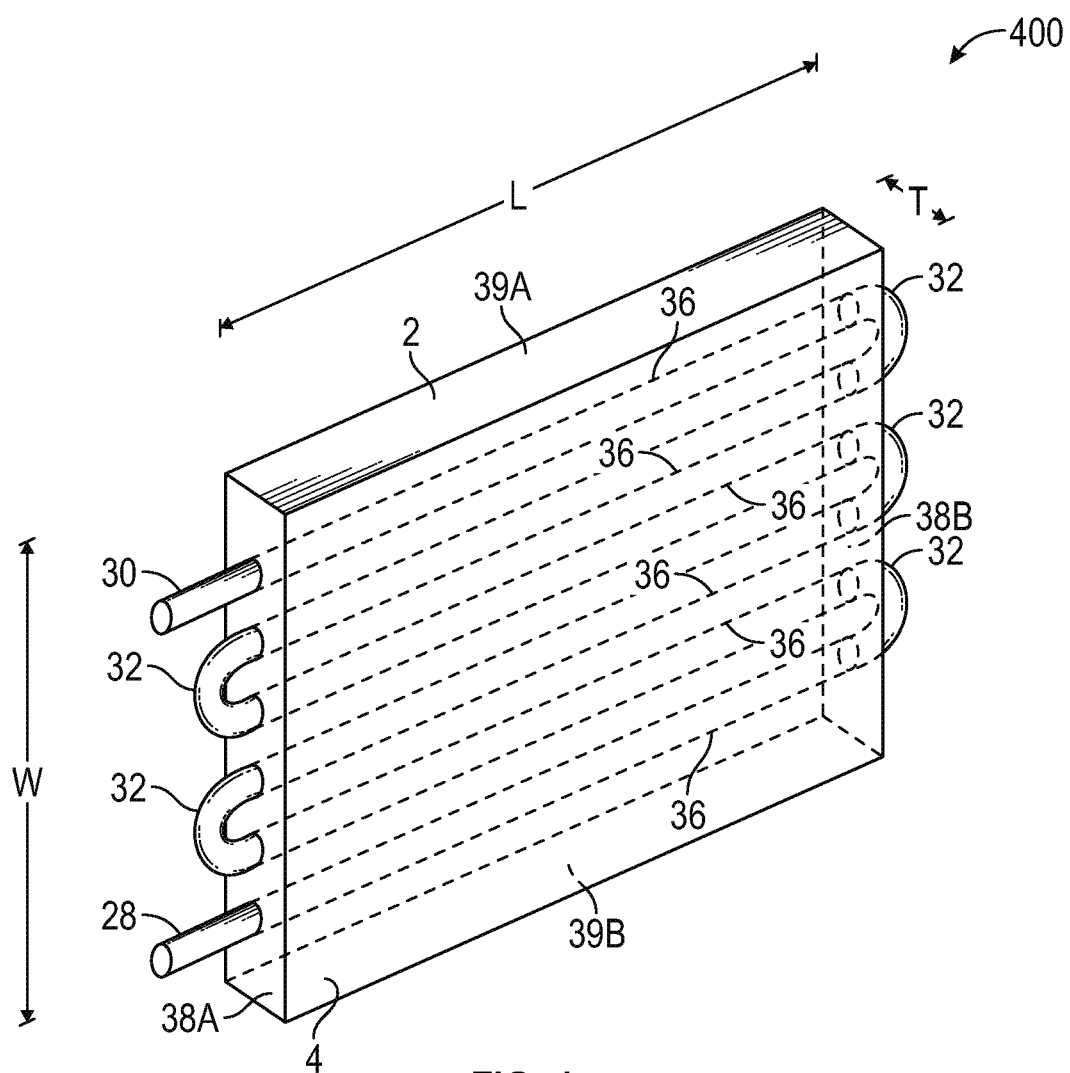
FIG. 4 is a schematic perspective view of another embodiment of a fluid-cooled panel of this disclosure.
Figure 5:
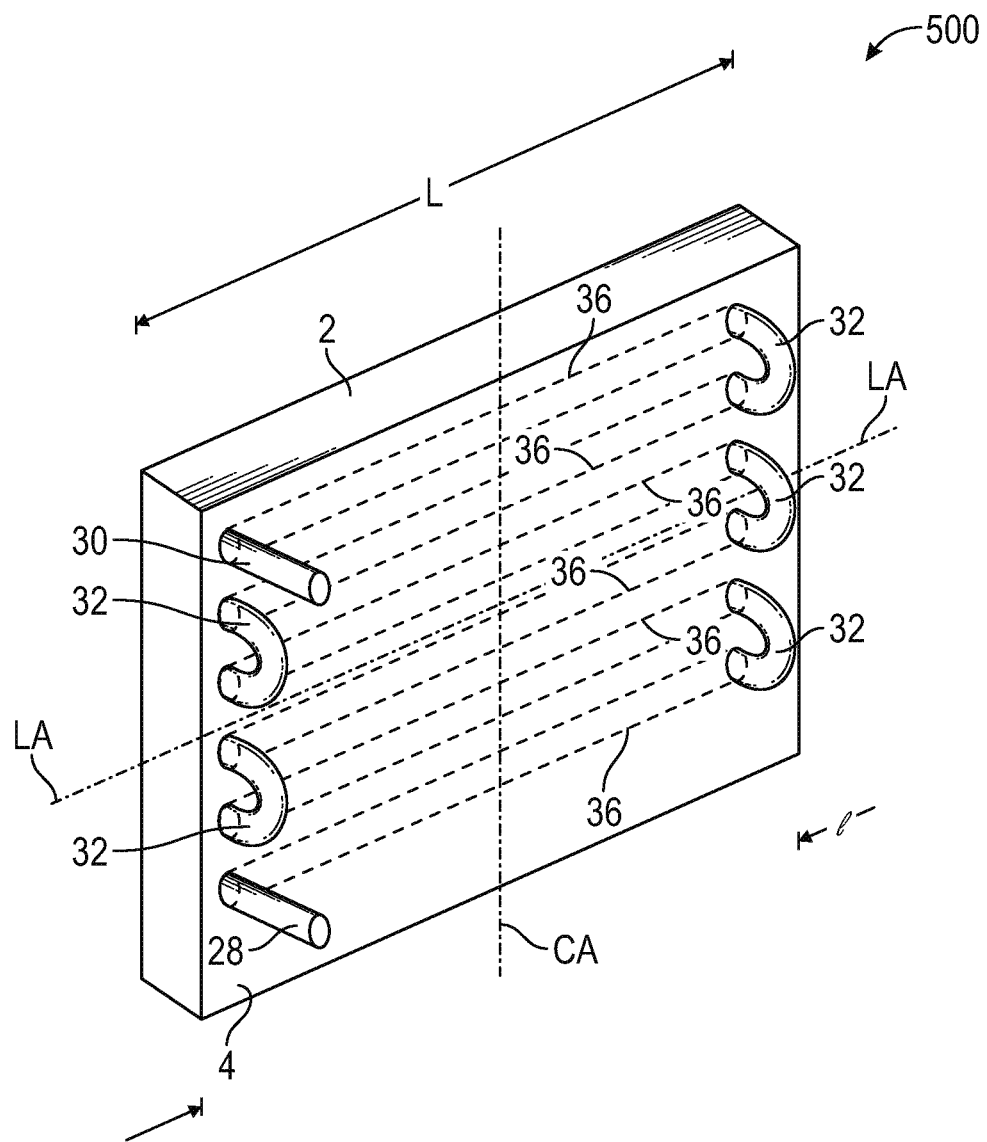
FIG. 5 is a schematic plan view of one embodiment of a conditioning channel apparatus and system in accordance with this disclosure.

Embodiments 200 and 300 illustrated schematically in FIGS. 2 and 3 in exploded perspective views, respectively, differ from embodiment 100 of FIG. 1 by each having l=L. Embodiment 200 further includes a coolant inlet conduit 28, a coolant outlet conduit 30, and a plurality of U-bends 32 for fluidly connecting the coolant flow passages formed between each of the substantially 90 degree metal plates 10. Conduits 28, 30, and U-bends 32 may be the same or different metal as primary metal plate 2 and end plates 16, 18, as further explained herein, and may be welded, brazed, or soldered to end plates 16, 18. Embodiment 300 differs from embodiment 200 by attaching the U-bends 32 and conduits 28, 30 to the second metal leg plate 26 of each substantially 90 degree metal piece as illustrated, it being understood there are two through holes in each metal leg plate 26, one near each end thereof, for passage of coolant. One advantage of the structure of embodiment 300 is that the cooling panels may be butted against one another when constructing the SCM, since there is no hardware protruding from end plates 16, 18.

Figure 6:
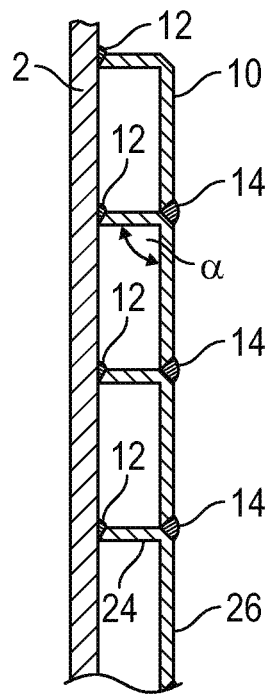
FIGS. 6 and 6A are schematic cross-sectional views along line C-C of FIG. 5.
Figure 6A:
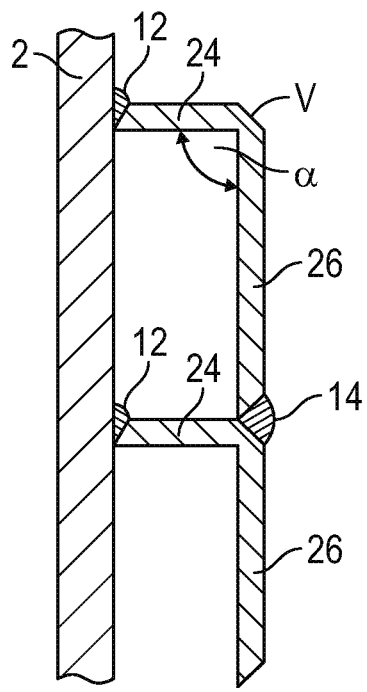

FIGS. 6 and 6A are close-up side elevation views illustrating the use of angle iron and welding to form the structures of embodiments 100, 200, and 300. Angle iron pieces 10 are available commercially having a substantially 90 degree angle "α" between first and second metal leg pieces 24, 26. A distal end of leg 24 from vertex (V) may be beveled as illustrated and welded to primary metal plate 2, and a distal end of leg 26 may be beveled and welded to the vertex of the next angle iron piece.

Embodiments 400 and 500 feature a one piece milled metal (pref. carbon steel) plate 2 having a length (L), width (W), a thickness (T), a longitudinal axis (LA), a central or vertical axis (CA), a first major surface 4 and an opposite major surface (not illustrated), and a perimeter edge having end faces 38A, 38B and top and bottom faces 39A, 39B. The one piece milled metal plate 2 of embodiment 400 includes a plurality of substantially parallel, equal length coolant flow channels 36 milled or formed therein of length L substantially parallel to the longitudinal axis (LA) and substantially perpendicular to the central axis (CA), and not intersecting from the first end face 38A to a second end face 38B of the one piece milled metal plate 2. Embodiment 400 feature adjacent coolant flow channels 36 connected at respective ends by a plurality of conduits 32 (for example U-bends) fluidly connecting adjacent ends of adjacent coolant flow channels 36 and configured to form a serpentine continuous coolant flow channel when coolant is introduced into conduit 28 and exits conduit 30 (or vice versa). Embodiment 500 differs from embodiment 400 in that it features a plurality of substantially parallel coolant flow channels 36 milled or formed therein of length l<L substantially parallel to the longitudinal axis (LA) and substantially perpendicular to the central axis (CA), and not intersecting from the first end face 38A to a second end face 38B of the one piece milled metal plate 2, and the coolant conduits 28, 30, and 32 are welded, brazed or otherwise fitted onto major surface 4 of the one piece milled metal plate 2, or fitted into through holes in one piece milled metal plate 2 so that a serpentine continuous coolant flow channel when coolant is introduced into conduit 28 and exits conduit 30 (or vice versa). Embodiment 500 presents the same advantage as embodiment 300 in that the panels may be butted against one another in constructing the SCM.

Figure 7:
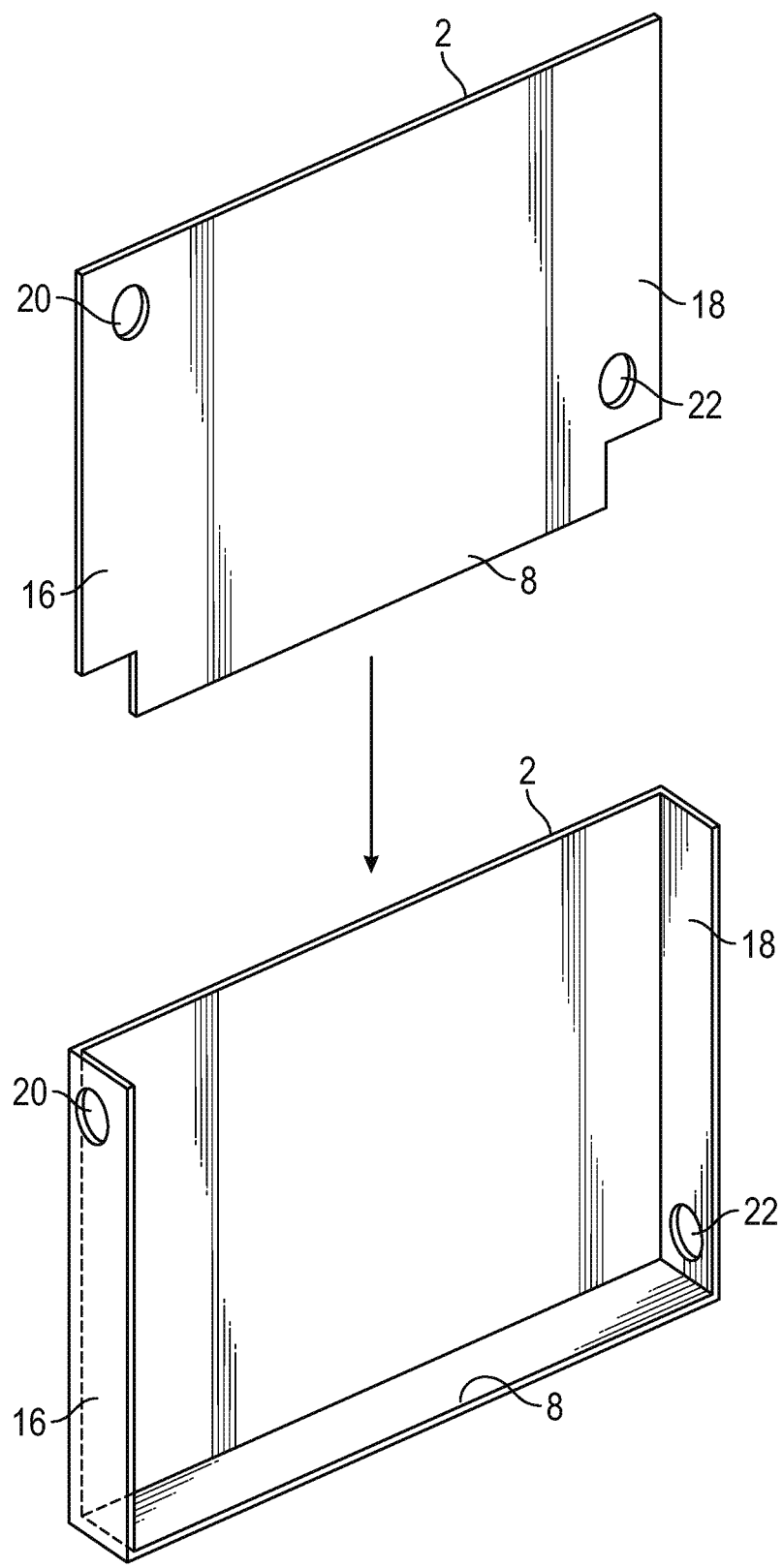
FIGS. 7 and 8 are cross-sectional views along line B-B of FIG. 1 illustrating schematically two embodiments of conditioning channels in accordance with the present disclosure.

FIG. 7 illustrates in perspective view a metal plate useful in constructing embodiments 100, 200, and 300, and illustrates that a single metal plate 2 may be molded or stamped into the shape illustrated in the upper portion of FIG. 7 (it being understood that holes 20, 22 would not be required for embodiment 300). Metal plate 2 could be stamped or molded, then bent in one or multiple steps to the shape illustrated in the lower portion of FIG. 7, thus eliminating the requirement of welding, brazing, or other heat-joining steps to join end plates 16, 18 and seal plate 8 to primary metal plate 2, as well as avoiding possible accelerated corrosion areas during operation of the SCM.

The various dimensions of the continuous flow submerged combustion melter cooling wall panels of the present disclosure may have values in accordance with Table 1, it being understood that these are merely examples, and other dimensions may be employed outside of these ranges.

TABLE 1

Dimensions of continuous flow submerged combustion melter cooling wall panels

| Feature | Embodiment 100 | 200 | 300 | 400 | 500 |
|---|---|---|---|---|---|
| L | 0.25-10 m | 0.25-10 m | 0.25-10 m | 0.25-10 m | 0.25-10 m |
|  | 1.0-5 m | 1.0-5 m | 1.0-5 m | 1.0-5 m | 1.0-5 m |
| W | 0.1-5 m | 0.1-5 m | 0.1-5 m | 0.1-5 m | 0.1-5 m |
|  | 1.0-2 m | 1.0-2 m | 1.0-2 m | 1.0-2 m | 1.0-2 m |
| t | 0.1-20 cm | 0.1-20 cm | 0.1-20 cm | N/A | N/A |
|  | 1-5 cm | 1-5 cm | 1-5 cm |  |  |
| T | 5-40 cm | 5-40 cm | 5-40 cm | 5-40 cm | 5-40 cm |
|  | 10-30 cm | 10-30 cm | 10-30 cm | 10-30 cm | 10-30 cm |
| I | 0.5 L-.95 L | I = L | I = L | I = L | 0.5 L-.95 L |
|  | 0.7-0.9 L |  |  |  | 0.7-0.9 L |
| $D_H$, hydraulic diameter of flow channel | 1-10 cm | 1-10 cm | 1-10 cm | 1-10 cm | 1-10 cm |
|  | 2-5 cm | 2-5 cm | 2-5 cm | 2-5 cm | 2-5 cm |
| α | 75-125 | 75-125 | 75-125 | N/A | N/A |
|  | 85-95 | 85-95 | 85-95 |  |  |

Figure 8:
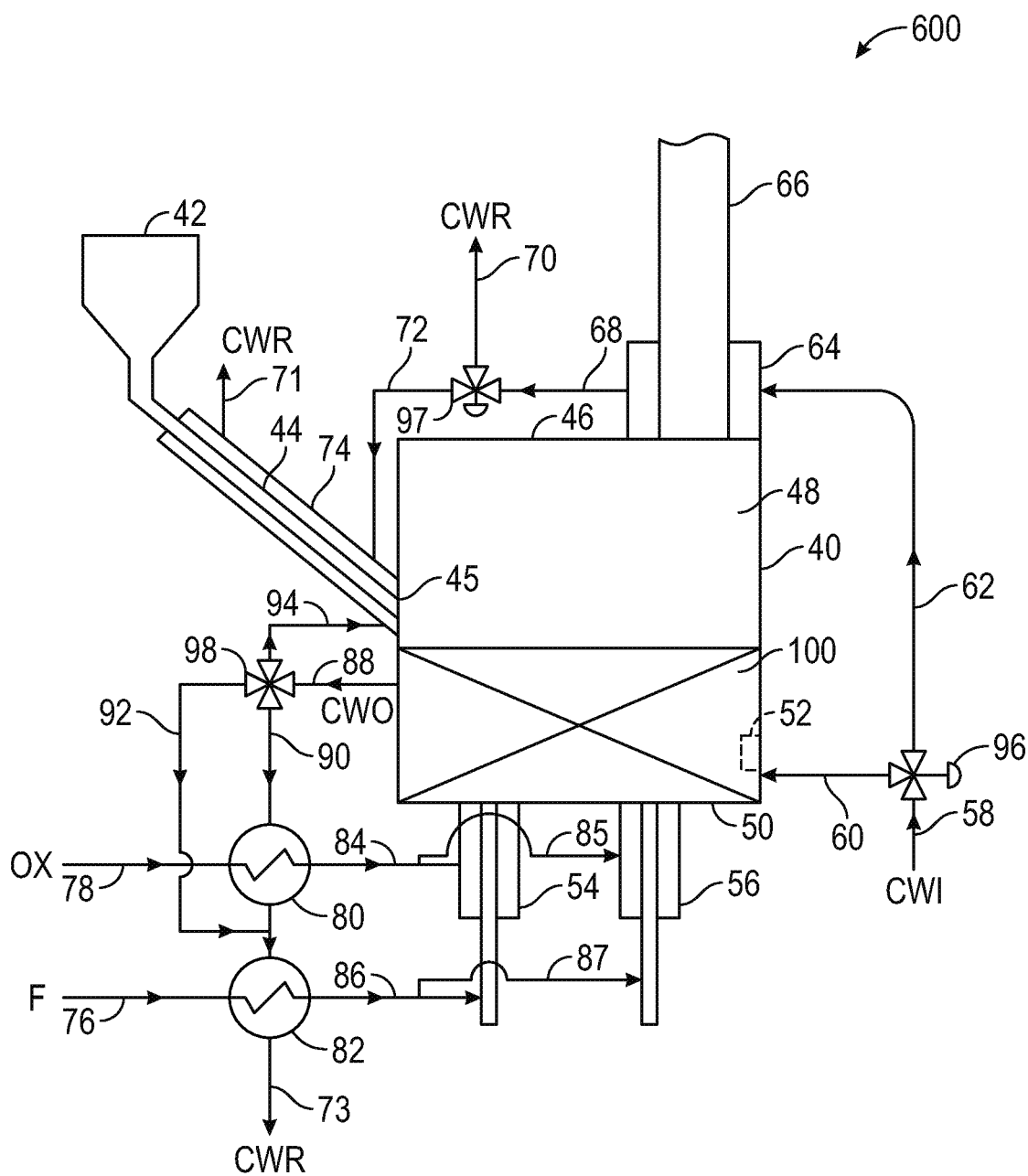

FIG. 8 is a schematic flow diagram of one SCM embodiment 600 and method in according to the present disclosure. Embodiment 600 illustrates an SCM 40, a feedstock supply 42 feeding the SCM through a feedstock chute 44 and feedstock inlet 45, the SCM having a ceiling or roof 46, a sidewall structure 48, and a floor 50, the sidewall structure connecting the roof 46 to the floor 50, and a melt outlet port 52 illustrated in phantom. Also illustrated schematically are SC burners 54, 56 of the pipe-in-pipe arrangement with fuel flowing through an inner conduit and oxidant through an outer conduit, it being understood that any SC burners could be used, as further disclosed herein, and that the flow of oxidant could rather be in the inner pipe and the flow of fuel in the outer pipe. A cooling water inlet (CWI) conduit 58 provides cooling water to a three-way control valve 96, having outlet conduits 60, 62. Outlet conduit supplies cooling water to continuous flow submerged combustion cooling panel 100, while conduit 62 may route a portion of the cooling water to a stack cooler 64 that serves to cool stack gases passing through SCM stack 66 in accordance with this embodiment. Warmed cooling water may then be routed from stack cooler 64 through a conduit 68 to another three-way control valve 97, and all or a portion routed to cooling water return (CWR) conduit 70, or optionally a portion may be routed through conduit 72 to a feedstock preheater 74 prior to being routed to cooling water return through conduit 71. Feedstock preheater may be a shell or jacket around feed chute 44, or more sophisticated heat exchanger. Warmed cooling water, or cooling water outlet (CWO) from continuous flow submerged combustion cooling panel 100 (there may be more than one such panel per SCM) may be routed through a conduit 88 to a four-way control valve 98, and separate portions of the warmed cooling water routed through conduits 90, 92 and used to preheat oxidant (OX) and/or fuel (F) using heat exchangers 80, 82, respectively. Fuel may be routed through a supply conduit 76 to heat exchanger 82, and warmed fuel through conduits 86, 87 to burners 54, 56. Similarly, or alternatively, feed oxidant may proceed through conduit 78 to heat exchanger 80, and warmed oxidant routed to SC burners 54, 56, though conduits 84, 85. A portion or all of warmed cooling water may also be routed through a conduit 94 to preheat feedstock.

It will be appreciated by those skilled in the art that many modifications of the scheme illustrated in FIG. 8 may be envisioned, and these variations are considered within the present disclosure. For example, all of the warmed cooling water or other coolant may be employed to preheat feedstock, rather than being used to preheat fuel or oxidant. Some or all of the warmed coolant may be used to vaporized oxidant, for example liquid oxygen. In certain embodiments, SC burners may be installed in the continuous flow cooling panels, and the coolant employed to cool parts of the burners.

It should furthermore be understood that embodiments 100-500 are only one example of many possible cooling panel shapes. Suitable shaped panels of metal may have any longitudinal shape (straight, L-shaped, curved, for example S-shaped), and may have one or more parallel and/or series arranged regions.

The flow rate of the coolant through channels in the cooling panels will depend on many factors, including the dimensions of channels, size of SC melter and the cooling panels, whether or not there are baffles in the channels, temperature of the melt and the coolant, and like parameters, but in general the flow rate of coolant will increase as the flow rate of feedstock and combustion products from the SC burners increases, and decrease accordingly when those parameters decrease.

Figure 9:
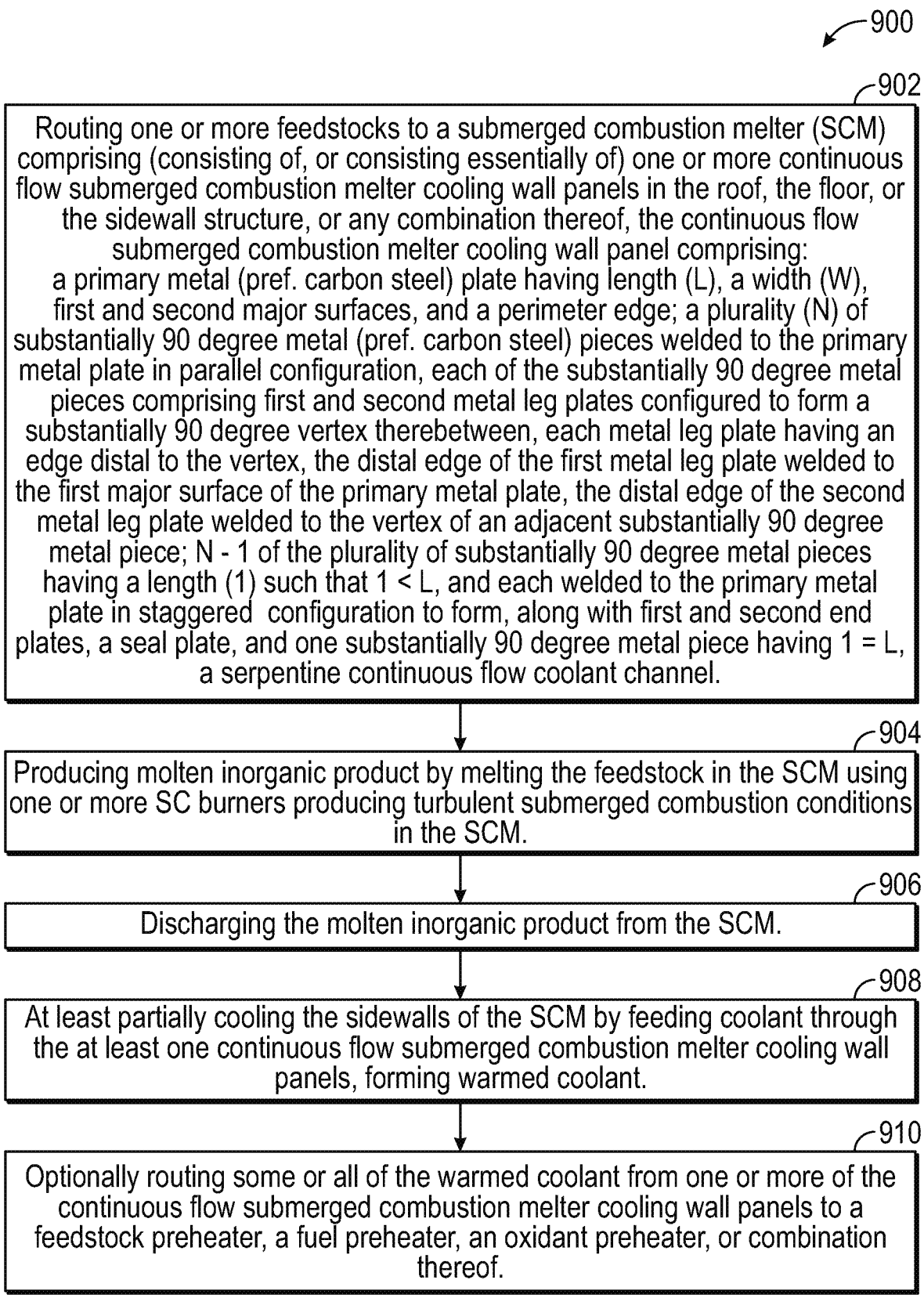
FIG. 9 is a logic diagram of a method embodiment of the present disclosure.

FIG. 9 is a logic diagram of one method embodiment 700 of the present disclosure, including the steps of (box 902) routing one or more feedstocks to a submerged combustion melter (SCM) comprising (consisting of, or consisting essentially of) one or more continuous flow submerged combustion melter cooling wall panels in the roof, the floor, or the sidewall structure, or any combination thereof, the continuous flow submerged combustion melter cooling wall panel comprising a primary metal (pref. carbon steel) plate having length (L), a width (W), first and second major surfaces, and a perimeter edge; a plurality (N) of substantially 90 degree metal (pref. carbon steel) pieces welded to the primary metal plate in parallel configuration, each of the substantially 90 degree metal pieces comprising first and second metal leg plates configured to form a substantially 90 degree vertex therebetween, each metal leg plate having an edge distal to the vertex, the distal edge of the first metal leg plate welded to the first major surface of the primary metal plate, the distal edge of the second metal leg plate welded to the vertex of an adjacent substantially 90 degree metal piece; N−1 of the plurality of substantially 90 degree metal pieces having a length (l) such that l<L, and each welded to the primary metal plate in staggered configuration to form, along with first and second end plates, a seal plate, and one substantially 90 degree metal piece having l=L, a serpentine continuous flow coolant channel. Method embodiment 900 further comprises producing molten inorganic product by melting the feedstock in the SCM using one or more SC burners producing turbulent submerged combustion conditions in the SCM (box 904); discharging the molten inorganic product from the SCM (box 906); at least partially cooling the sidewalls of the SCM by feeding coolant through the at least one continuous flow submerged combustion melter cooling wall panels, forming warmed coolant (box 908); and optionally routing some or all of the warmed coolant from one or more of the continuous flow submerged combustion melter cooling wall panels to a feedstock preheater, a fuel preheater, an oxidant preheater, or combination thereof (box 910). It will be understood that methods using other embodiments of continuous flow submerged combustion cooling panels, and embodiments wherein two or more types of continuous flow submerged combustion cooling panels in accordance with the present disclosure, are with in the present disclosure.

Submerged combustion melter 40 in embodiments described herein may be any of the currently known submerged combustion melter designs or may be one of those described in Applicant's U.S. Pat. No. 8,769,992, as long as they include at least one continuous flow submerged combustion cooling panel in accordance with the present disclosure. Submerged combustion melters useful in the practice of the methods and apparatus of this description may take any number of forms, including those described in Applicant's U.S. Pat. No. 8,769,992, which describes sidewalls forming an expanding melting zone formed by a first trapezoidal region, and a narrowing melting zone formed by a second trapezoidal region, wherein a common base between the trapezoid defines the location of the maximum width of the melter. Submerged combustion melter 40 may include a roof, sidewalls, a floor or bottom, one or more submerged combustion burners, an exhaust system (for example, such as described in Applicant's U.S. Pat. No. 8,707,740), one or more molten product outlet structures (for example, such as described in Applicant's U.S. Pat. No. 9,145,319), and optionally one or more non-fluid-cooled panels comprising some or all of the sidewalls. Submerged combustion melter 40 is typically supported on a plant floor.

Submerged combustion melter 40 may be fed a variety of feed materials by one or more roll stands, which in turn supports one or more rolls of glass mat, as described in Applicant's U.S. Pat. No. 8,650,914. In certain embodiments powered nip rolls may include cutting knives or other cutting components to cut or chop the mat (or roving, in those embodiments processing roving) into smaller length pieces prior to entering melter 40. Also provided in certain embodiments may be a glass batch feeder. Glass batch feeders are well-known in this art and require no further explanation. Certain embodiments may comprise a process control scheme for the submerged combustion melter and burners. For example, as explained in the '914 patent, a master process controller may be configured to provide any number of control logics, including feedback control, feed-forward control, cascade control, and the like. The disclosure is not limited to a single master process controller, as any combination of controllers could be used. The term "control", used as a transitive verb, means to verify or regulate by comparing with a standard or desired value. Control may be closed loop, feedback, feed-forward, cascade, model predictive, adaptive, heuristic and combinations thereof. The term "controller" means a device at least capable of accepting input from sensors and meters in real time or near-real time, and sending commands directly to burner control elements, and/or to local devices associated with burner control elements and glass mat feeding devices able to accept commands. A controller may also be capable of accepting input from human operators; accessing databases, such as relational databases; sending data to and accessing data in databases, data warehouses or data marts; and sending information to and accepting input from a display device readable by a human. A controller may also interface with or have integrated therewith one or more software application modules, and may supervise interaction between databases and one or more software application modules. The controller may utilize Model Predictive Control (MPC) or other advanced multivariable control methods used in multiple input/multiple output (MIMO) systems. The methods of Applicant's U.S. Pat. No. 8,973,400, using the vibrations and oscillations of the melter itself, and U.S. Pat. No. 9,096,453, using temperature control, may prove useful predictive control inputs.

Those having ordinary skill in this art will appreciate that there are many possible variations of the melter, continuous flow cooling panels, burners, heat exchangers, and control mechanisms, and will be able to devise alternatives and improvements to those described herein that are nevertheless considered to be within the claims of the present patent.

Submerged combustion burners useful in the SC melter apparatus described herein include those described in U.S. Pat. Nos. 4,539,034; 3,170,781; 3,237,929; 3,260,587; 3,606,825; 3,627,504; 3,738,792; 3,764,287; and 7,273,583, and Applicant's U.S. Pat. Nos. 8,875,544 and 9,032,760. One useful burner, for example, is described in the '583 patent as comprising a method and apparatus providing heat energy to a bath of molten material and simultaneously creating a well-mixed molten material. The burner functions by firing a burning gaseous or liquid fuel-oxidant mixture into a volume of molten material. The burners described in the '583 patent provide a stable flame at the point of injection of the fuel-oxidant mixture into the melt to prevent the formation of frozen melt downstream as well as to prevent any resultant explosive combustion; constant, reliable, and rapid ignition of the fuel-oxidant mixture such that the mixture burns quickly inside the molten material and releases the heat of combustion into the melt; and completion of the combustion process in bubbles rising to the surface of the melt. SC burners such as described in Applicant's co-pending U.S. patent application Ser. Nos. 14/785,327; 14/785,325 (now U.S. Pat. No. 10,654,740 issued May 19, 2020); Ser. No. 14/785,330 (now U.S. Pat. No. 10,183,884 issued Jan. 22, 2019); and Ser. No. 14/785,324 (now U.S. Pat. No. 10,138,151 issued Nov. 27, 2019), all filed Oct. 17, 2015 (the first featuring reduced stress and thermal fatigue of the top toroid shape, the second featuring Pt/Rh or Cu-alloy based burners tips and attachment to the remainder of the burner, usually carbon steel; and the third featuring burners having improved fuel and oxidant mixing; and the fourth featuring a toroid burner tip and protective cap for same) may be used. Other SC burners that may be used include the SC burners described in Applicant's U.S. patent application Ser. No. 14/904,662, filed Jan. 1, 2016 (now U.S. Pat. No. 10,858,278 issued Dec. 8, 2020) (featuring attaching a toroid burner tip to the body of the burner using interlocking rings) and Ser. No. 14/784,995, filed Oct. 15, 2015 )now U.S. Pat. No. 9,777,922 issued Oct. 3, 2017 (featuring a concave burner tip crown); Ser. No. 14/778,206, filed Sep. 18, 2015 (now U.S. Pat. No. 10,131,563 issued Nov. 20, 2018 (featuring a spin-formed or stamped burner tip); the SC burners and burner panels described in Applicant's U.S. patent application Ser. No. 14/838,148 (now U.S. Pat. No. 10,670,261 issued Jun. 2, 2020) and Ser. No. 14/838,229 (now U.S. Pat. No. 10,041,666 issued Aug. 7, 2018), both filed Aug. 27, 2015; and the SC burners described in Applicant's U.S. patent application Ser. No. 15/246,705, filed Aug. 25, 2016 (now U.S. Pat. No. 10,337,732 issued Jul. 2, 2019).

In certain embodiments the SC burners may be floor-mounted burners. In certain embodiments, the SC burners may be positioned in rows substantially perpendicular to the longitudinal axis (in the melt flow direction) of melter 40. In certain embodiments, the SC burners may be positioned to emit combustion products into molten glass in a melting zone of melter 40 in a fashion so that the gases penetrate the melt generally perpendicularly to the floor. In other embodiments, one or more burners may emit combustion products into the melt at an angle to the floor, as taught in Applicant's U.S. Pat. No. 8,769,992.

Submerged combustion melters useful in systems and methods in accordance with the present disclosure may also comprise one or more wall-mounted submerged combustion burners, and/or one or more roof-mounted non-submerged combustion burners or burner panels. Roof-mounted non-submerged combustion burners and panels may be useful to preheat the melter apparatus melting zone, and serve as ignition sources for one or more submerged combustion burners. Melters having only wall-mounted, submerged-combustion burners are also considered within the present disclosure. Roof-mounted burners may be oxy-fuel burners, but as they are only used in certain situations, are more likely to be air/fuel burners. Most often they would be shut-off after pre-heating the melter and/or after starting one or more submerged combustion burners. In certain embodiments, if there is a possibility of carryover of particles to the exhaust, one or more roof-mounted burners could be used to form a curtain to prevent particulate carryover. In certain embodiments, all submerged combustion burners may be oxy/fuel burners (where "oxy" means oxygen, or oxygen-enriched air, as described earlier), but this is not necessarily so in all embodiments; some or all of the submerged combustion burners may be air/fuel burners. Furthermore, heating may be supplemented by electrical heating in certain melter embodiments, in certain melter zones, and in the lehr. In certain embodiments the oxy-fuel burners may comprise one or more submerged combustion burners each having co-axial fuel and oxidant tubes forming an annular space there between, wherein the outer tube extends beyond the end of the inner tube, as taught in U.S. Pat. No. 7,273,583. Burners may be flush-mounted with the melter floor in certain embodiments. In other embodiments, such as disclosed in the '583 patent, a portion of one or more of the burners may extend slightly into the melt above the melter floor.

In certain embodiments, melter side walls may have a free-flowing form, devoid of angles. In certain other embodiments, side walls may be configured so that an intermediate location may comprise an intermediate region of melter 40 having constant width, extending from a first trapezoidal region to the beginning of a narrowing melting region. Other embodiments of suitable melters are described in the above-mentioned '992 patent.

The continuous flow submerged combustion melter cooling panels of the present disclosure may include a thin refractory liner on major surface facing inward toward the molten material inside the SCM, which minimizes heat losses from the melter, but allows formation of a thin frozen glass shell to form on the surfaces and prevent any refractory wear and associated molten product contamination. In certain embodiments, the continuous flow submerged combustion melter cooling wall panel may be cooled by a heat transfer fluid selected from the group consisting of gaseous, liquid, or combinations of gaseous and liquid compositions that functions or is capable of being modified to function as a heat transfer fluid. Gaseous heat transfer fluids may be selected from air, including ambient air and treated air (for air treated to remove moisture), inert inorganic gases, such as nitrogen, argon, and helium, inert organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids may be selected from water, inert liquids that may be organic, inorganic, or some combination thereof, for example, salt solutions, glycol solutions, oils and the like. Water is the preferred heat transfer fluid. Other possible heat transfer fluids include steam (if cooler than the oxygen manifold temperature), carbon dioxide, or mixtures thereof with nitrogen. Heat transfer fluids may be compositions comprising both gas and liquid phases, such as the higher chlorofluorocarbons.

Continuous flow submerged combustion melter cooling wall panel metal plates and conduits, when in alloyed form, may comprise alloys of two or more noble metals that may have any range of noble metals. For example, alloys of two noble metals may have a range of about 0.01 to about 99.99 percent of a first noble metal and 99.99 to 0.01 percent of a second noble metal. Any and all ranges in between 0 and 99.99 percent first noble metal and 99.99 and 0 percent second noble metal are considered within the present disclosure, including 0 to about 99 percent of first noble metal; 0 to about 98 percent; 0 to about 97 percent; 0 to about 96; 0 to about 95; 0 to about 90; 0 to about 80; 0 to about 75; 0 to about 70; 0 to about 65; 0 to about 60; 0 to about 55; 0 to about 50; 0 to about 45, 0 to about 40; 0 to about 35; 0 to about 30; 0 to about 25; 0 to about 20; 0 to about 19; 0 to about 18; 0 to about 17; 0 to about 16; 0 to about 15; 0 to about 14; 0 to about 13; 0 to about 12; 0 to about 11; 0 to about 10; 0 to about 9; 0 to about 8; 0 to about 7; 0 to about 6; 0 to about 5; 0 to about 4; 0 to about 3; 0 to about 2; 0 to about 1; and 0 to about 0.5 percent of a first noble metal; with the balance comprising a second noble metal, or consisting essentially of (or consisting of) a second noble metal (for example with one or more base metals present at no more than about 10 percent, or no more than about 9 percent base metal, or no more than about 8, or about 7, or about 6, or about 5, or about 4, or about 3, or about 2, or no more than about 1 percent base metal).

In certain noble metal alloy embodiments comprising three or more noble metals, the percentages of each individual noble metal may range from equal amounts of all noble metals in the composition (about 33.33 percent of each), to compositions comprising, or consisting essentially of, or consisting of 0.01 percent of a first noble metal, 0.01 percent of a second noble metal, and 99.98 percent of a third noble metal. Any and all ranges in between about 33.33 percent of each, and 0.01 percent of a first noble metal, 0.01 percent of a second noble metal, and 99.98 percent of a third noble metal, are considered within the present disclosure.

Embodiments disclosed herein include:

A: A continuous flow submerged combustion melter cooling panel comprising:
a primary metal (pref. carbon steel) plate having length (L), a width (W), first and second major surfaces, and a perimeter edge;
a plurality (N) of substantially 90 degree metal (pref. carbon steel) pieces welded to the primary metal plate in parallel configuration, each of the substantially 90 degree metal pieces comprising first and second metal leg plates configured to form a substantially 90 degree vertex therebetween, each metal leg plate having an edge distal to the vertex, the distal edge of the first metal leg plate welded to the first major surface of the primary metal plate, the distal edge of the second metal leg plate welded to the vertex of an adjacent substantially 90 degree metal piece;
N−1 of the plurality of substantially 90 degree metal pieces having a length (l) such that l<L, and each welded to the primary metal plate in staggered configuration to form, along with first and second end plates, a seal plate, and one substantially 90 degree metal piece having l=L, a serpentine continuous flow coolant channel.

B: A continuous flow submerged combustion melter cooling panel comprising:
a primary metal plate having length (L), a width (W), first and second major surfaces, and a perimeter edge;
a plurality of substantially 90 degree metal pieces welded to the primary metal plate in parallel configuration, each of the substantially 90 degree metal pieces comprising first and second metal leg plates configured to form a substantially 90 degree vertex therebetween, each metal leg plate having an edge distal to the vertex, the distal edge of the first metal leg plate welded to the first major surface of the primary metal plate, the distal edge of the second metal leg plate welded to the vertex of an adjacent substantially 90 degree metal piece;
each of the plurality of substantially 90 degree metal pieces having a length (l) such that l=L, and each welded to the primary metal plate to form, along with first and second end plates and a seal plate, a plurality of substantially parallel, equal length coolant flow channels; and
a plurality of conduits fluidly connecting adjacent ends of the flow passages through the first and second end plates and configured to form a serpentine continuous coolant flow channel.

C: A continuous flow submerged combustion melter cooling panel comprising:
a primary metal plate having length (L), a width (W), first and second major surfaces, and a perimeter edge;
a plurality of substantially 90 degree metal pieces welded to the primary metal plate in parallel configuration, each of the substantially 90 degree metal pieces comprising first and second metal leg plates configured to form a substantially 90 degree vertex therebetween, each metal leg plate having an edge distal to the vertex, the distal edge of the first metal leg plate welded to the first major surface of the primary metal plate, the distal edge of the second metal leg plate welded to the vertex of an adjacent substantially 90 degree metal piece;
each of the plurality of substantially 90 degree metal pieces having a length (l) such that l=L, and each welded to the primary metal plate to form, along with first and second end plates and a seal plate, a plurality of substantially parallel, equal length coolant flow channels; and
a plurality of conduits fluidly connecting adjacent ends of the flow passages through the second metal leg of the a plurality of substantially 90 degree metal pieces and configured to form a serpentine continuous coolant flow channel.

D: A continuous flow submerged combustion melter cooling panel comprising:
a one piece milled metal (pref. carbon steel) plate having a length (L), width (W), a longitudinal axis, a thickness (T), first and second major surfaces, and a perimeter edge, the one piece milled metal plate comprising a plurality of substantially parallel, equal length coolant flow channels milled or formed therein substantially parallel to longitudinal axis and not intersecting from a first end to a second end of the one piece milled metal plate, and
adjacent coolant flow channels connected at respective ends by a plurality of conduits fluidly connecting adjacent ends of the adjacent coolant flow channels and configured to form, a serpentine continuous coolant flow channel.

E: A continuous flow submerged combustion melter cooling panel comprising:
a one piece milled metal (pref. carbon steel) plate having a length (L), width (W), a longitudinal axis, a thickness (T), first and second major surfaces, and a perimeter edge, the one piece milled metal plate comprising a plurality of non-through passages milled or formed therein substantially parallel to the longitudinal axis and not intersecting from a first end to the second end of the plate, the milled or formed non-through passages configured such that they extend from one minor edge of the plate to greater than 80 percent but not more than 99 percent of the length (L), adjacent through passages connected by surface conduits fluidly connected to the non-through passages by a plurality of connecting passages extending from one major surface to each of the non-through passages, and configured to produce a continuous coolant fluid flow passage through the plate.

Embodiments A, B and C may have one or more of the following additional elements in any combination: Element 1: the first and second end plates are welded to respective first and second portions of the perimeter edge of the primary metal plate and to ends of alternating ones of the substantially 90 degree metal pieces and to first and second ends of the seal plate. Element 2: the first and second end plates are substantially 90 degree formed, machined, or bent end portions of the primary metal plate, and the seal plate is welded to an edge formed by the primary metal plate and the first and second end plates. Element 3: the first and second end plates are substantially 90 degree formed, machined, or bent end peripheral portions of the primary metal plate, and the seal plate is a substantially 90 degree formed, machined, or bent side peripheral portion of the primary metal plate, the seal plate having minor edges welded to minor edges of the first and second end plates. Element 4: the plurality of substantially 90 degree metal pieces are each angle iron bent to an L-shape to form the first and second metal legs. Element 5: the first and second metal leg plates are substantially equal in length. Element 6: at least one of the plurality of substantially 90 degree metal pieces are configured to form at least one internal baffle. Element 7: the continuous flow submerged combustion melter cooling wall panel has an arcuate shape viewed in plan. Element 8: the continuous flow submerged combustion melter cooling wall panel has at least one additional layer attached to the panel away from the primary metal plate, the at least one additional layer selected form the group consisting of refractory, another layer of substantially 90 degree metal pieces welded to the plurality of substantially 90 degree metal pieces, and combinations thereof. Element 9: the continuous flow submerged combustion melter cooling wall panel has at least one opening for positioning of a submerged combustion burner therein.

Embodiments D and E may have one or more of the following additional elements in any combination: Element 1: each of the coolant flow channels has a diameter (D) less than (T) with the proviso that D is 1 inch (2.5 cm) or greater. Element 2: each of the coolant flow channels are substantially identical in diameter, length and shape. Element 3: the coolant flow channels are separated by distance of no more than 3 inches (or no more than 2 inches, or no more than 1 inch, or no more than 0.5 inch). Element 4: the coolant flow channels have a cross-section selected from the group consisting of circular, semi-circular, polygonal, trapezoidal, triangular, irregular, and combinations thereof. Element 5: the continuous flow submerged combustion melter cooling wall panel has an arcuate shape viewed in plan. Element 6: the continuous flow submerged combustion melter cooling wall panel has at least one additional layer attached to the one piece milled metal plate, the at least one additional layer selected from the group consisting of refractory, a second one piece milled metal plate, and combinations thereof. Element 7: the continuous flow submerged combustion melter cooling wall panel has at least one opening for positioning of a submerged combustion burner therein.

All of embodiments A, B, C, D, and E may be installed in an SCM, and all may be used in methods of making molten products (glass products, mineral products, rock products) using the SCM. All of the SCM embodiments may employ one or more heat recovery schemes described herein, alone or in combination.

Although only a few exemplary embodiments of this disclosure have been described in detail above, those skilled in the art will readily appreciate that many modifications are possible in the exemplary embodiments without materially departing from the novel apparatus and processes described herein. Accordingly, all such modifications are intended to be included within the scope of this disclosure as defined in the following claims. In the claims, no clauses are intended to be in the means-plus-function format allowed by 35 U.S.C. § 112(f) unless "means for" is explicitly recited together with an associated function. "Means for" clauses are intended to cover the structures described herein as performing the recited function and not only structural equivalents, but also equivalent structures.

What is claimed is:

1. A continuous flow submerged combustion melter cooling wall panel comprising:
    a primary metal plate having length (L), a width (W), first and second major surfaces, and a perimeter edge;
    a plurality of substantially 90 degree metal pieces welded to the primary metal plate in parallel configuration, each of the substantially 90 degree metal pieces comprising first and second metal leg plates configured to form a substantially 90 degree vertex therebetween, each metal leg plate having an edge distal to the vertex, the distal edge of the first metal leg plate welded to the first major surface of the primary metal plate, the distal edge of the second metal leg plate welded to the vertex of an adjacent substantially 90 degree metal piece;
    each of the plurality of substantially 90 degree metal pieces having a length (l) such that l=L, and each welded to the primary metal plate to form, along with first and second end plates and a seal plate, a plurality of substantially parallel, equal length coolant flow channels; and
    a plurality of conduits fluidly connecting adjacent ends of the flow passages through the first and second end plates and configured to form a serpentine continuous coolant flow channel.

2. The continuous flow submerged combustion melter cooling wall panel of claim 1 wherein the first and second end plates are welded to respective first and second portions of the perimeter edge of the primary metal plate and to ends of the substantially 90 degree metal pieces and to first and second ends of the seal plate.

3. The continuous flow submerged combustion melter cooling wall panel of claim 1 wherein the first and second end plates are substantially 90 degree formed, machined, or bent end portions of the primary metal plate, and the seal plate is welded to an edge formed by the primary metal plate and the first and second end plates.

4. The continuous flow submerged combustion melter cooling wall panel of claim 1 wherein the first and second end plates are substantially 90 degree formed, machined, or bent end peripheral portions of the primary metal plate, and the seal plate is a substantially 90 degree formed, machined, or bent side peripheral portion of the primary metal plate, the seal plate having minor edges welded to minor edges of the first and second end plates.

5. The continuous flow submerged combustion melter cooling wall panel of claim11 wherein the plurality of substantially 90 degree metal pieces are each angle iron bent to an L-shape to form the first and second metal leg plates.

6. The continuous flow submerged combustion melter cooling wall panel of claim 5 wherein the first and second metal leg plates are substantially equal in length.

7. The continuous flow submerged combustion melter cooling wall panel of claim 1 wherein at least one of the plurality of substantially 90 degree metal pieces are configured to form at least one internal baffle.

8. The continuous flow submerged combustion melter cooling wall panel of claim 1 having an arcuate shape viewed in plan.

9. The continuous flow submerged combustion melter cooling wall panel of claim 1 having at least one additional layer attached to the panel away from the primary metal plate, the at least one additional layer selected fromform the group consisting of refractory, another layer of substantially 90 degree metal pieces welded to the plurality of substantially 90 degree metal pieces, and combinations thereof.

10. The continuous flow submerged combustion melter cooling wall panel of claim 1 having at least one opening for positioning of a submerged combustion burner therein.

11. A submerged combustion melter comprising one or more continuous flow submerged combustion melter cooling wall panels in either the roof, the sidewall structure, or both, the continuous flow submerged combustion melter cooling wall panel comprising:
    a primary metal plate having length (L), a width (W), first and second major surfaces, and a perimeter edge;
    a plurality of substantially 90 degree metal pieces welded to the primary metal plate in parallel configuration, each of the substantially 90 degree metal pieces comprising first and second metal leg plates configured to form a substantially 90 degree vertex therebetween, each metal leg plate having an edge distal to the vertex, the distal edge of the first metal leg plate welded to the first major surface of the primary metal plate, the distal edge of the second metal leg plate welded to the vertex of an adjacent substantially 90 degree metal piece;
    each of the plurality of substantially 90 degree metal pieces having a length (l) such that l=L, and each welded to the primary metal plate to form, along with first and second end plates and a seal plate, a plurality of substantially parallel, equal length coolant flow channels; and a plurality of conduits fluidly connecting adjacent ends of the flow passages through the first and second end plates and configured to form a serpentine continuous coolant flow channel.

12. A method of producing molten inorganic product comprising feeding one or more feedstocks to a submerged combustion melter, melting the feedstock using turbulent submerged combustion, and discharging the molten inorganic product from the submerged combustion melter, the submerged combustion melter comprising one or more continuous flow submerged combustion melter cooling wall panels in either the roof, the sidewall structure, or both, the one or more continuous flow submerged combustion melter cooling wall panel comprising:

a primary metal plate having length (L), a width (W), first and second major surfaces, and a perimeter edge;

a plurality of substantially 90 degree metal pieces welded to the primary metal plate in parallel configuration, each of the substantially 90 degree metal pieces comprising first and second metal leg plates configured to form a substantially 90 degree vertex therebetween, each metal leg plate having an edge distal to the vertex, the distal edge of the first metal leg plate welded to the first major surface of the primary metal plate, the distal edge of the second metal leg plate welded to the vertex of an adjacent substantially 90 degree metal piece;

each of the plurality of substantially 90 degree metal pieces having a length (l) such that l=L, and each welded to the primary metal plate to form, along with first and second end plates and a seal plate, a plurality of substantially parallel, equal length coolant flow channels; and a plurality of conduits fluidly connecting adjacent ends of the flow passages through the first and second end plates and configured to form a serpentine continuous coolant flow channel.

13. The method of claim 12 comprising routing warmed coolant from one or more of the one or more ontinuous flow submerged combustion melter cooling wall panels to a feedstock preheater, a fuel preheater, an oxidant preheater, or combination thereof.

* * * * *